(12) United States Patent
Kobayashi et al.

(10) Patent No.: US 12,091,006 B2
(45) Date of Patent: Sep. 17, 2024

(54) PROACTIVE MESSAGE TRANSMITTER IDENTIFICATION SYSTEM

(71) Applicant: TOYOTA JIDOSHA KABUSHIKI KAISHA, Toyota (JP)

(72) Inventors: Hiromitsu Kobayashi, Toyota (JP); Kyungtae Han, Mountain View, CA (US)

(*) Notice: Subject to any disclaimer, the term of this patent is extended or adjusted under 35 U.S.C. 154(b) by 281 days.

(21) Appl. No.: 16/365,053

(22) Filed: Mar. 26, 2019

(65) Prior Publication Data

US 2020/0307580 A1    Oct. 1, 2020

(51) Int. Cl.
*B60W 30/16*    (2020.01)
*B60W 30/09*    (2012.01)

(52) U.S. Cl.
CPC ............ *B60W 30/16* (2013.01); *B60W 30/09* (2013.01); *B60W 2556/65* (2020.02); *B60W 2754/30* (2020.02); *B60W 2756/10* (2020.02)

(58) Field of Classification Search
CPC ......... B60W 2300/00; B60W 2400/00; B60W 2554/00; B60W 2555/00; B60W 2556/00; B60W 2720/00; B60W 2754/00; B60W 2756/00; B60W 2900/00; B60W 30/00; B60W 40/00; B60W 60/00; B60W 30/16; B60W 30/09; B60W 2756/10; B60W 2556/65; B60W 2754/30; G01S 5/02213
USPC .......................................................... 701/96
See application file for complete search history.

(56) References Cited

U.S. PATENT DOCUMENTS

| | | | |
|---|---|---|---|
| 9,272,711 B1* | 3/2016 | Sivaraman | G08G 1/163 |
| 10,133,280 B2* | 11/2018 | Kim | G08G 1/0141 |
| 2013/0138320 A1* | 5/2013 | Aso | G08G 1/0116 701/96 |
| 2013/0279392 A1* | 10/2013 | Rubin | H04L 67/12 370/312 |
| 2017/0219360 A1* | 8/2017 | Cui | G01C 21/34 |
| 2017/0297574 A1* | 10/2017 | Trageser | B60W 30/14 |
| 2018/0216942 A1* | 8/2018 | Wang | G01S 17/89 |
| 2019/0130762 A1* | 5/2019 | Yang | H04W 4/40 |
| 2019/0277946 A1* | 9/2019 | Hodges | G05D 1/0212 |

\* cited by examiner

*Primary Examiner* — Thomas E Worden
*Assistant Examiner* — Sean Patrick Reidy
(74) *Attorney, Agent, or Firm* — Burbage Law, P.C.; Jon-Michael Burbage

(57) ABSTRACT

The disclosure includes embodiments for identifying a transmitter of a Vehicle-to-Everything (V2X) message. In some embodiments, a method for an ego vehicle includes modifying an operation of a communication unit of the ego vehicle to receive a V2X message that includes identification data of a transmitter of the V2X message. The method includes executing a proactive vehicle control operation on the ego vehicle to modify a distance between the ego vehicle and a preceding vehicle ahead of the ego vehicle so that the distance satisfies a distance threshold. The method includes determining whether the preceding vehicle is the transmitter based on the identification data so that a reliable determination is achieved to improve a driving safety of the ego vehicle responsive to the distance satisfying the distance threshold.

20 Claims, 22 Drawing Sheets

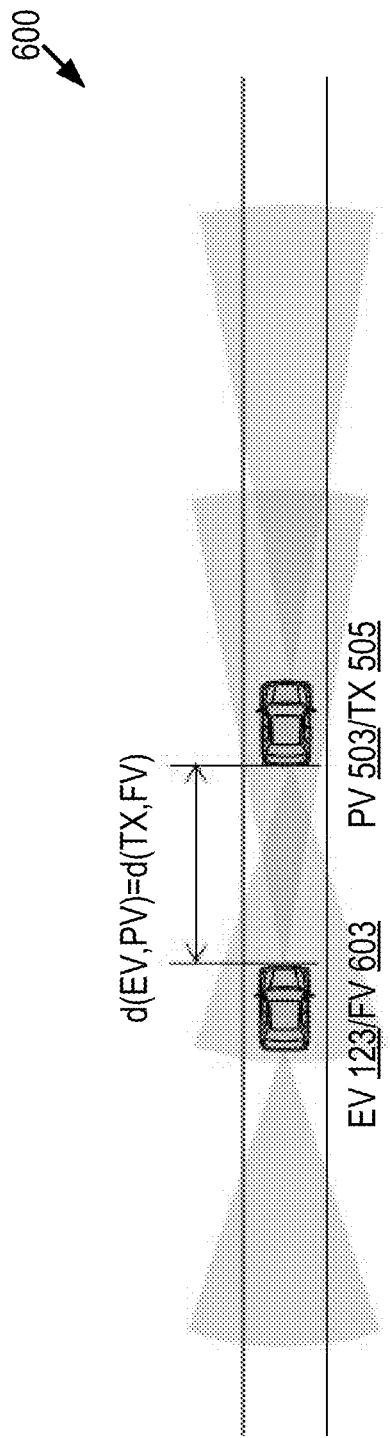
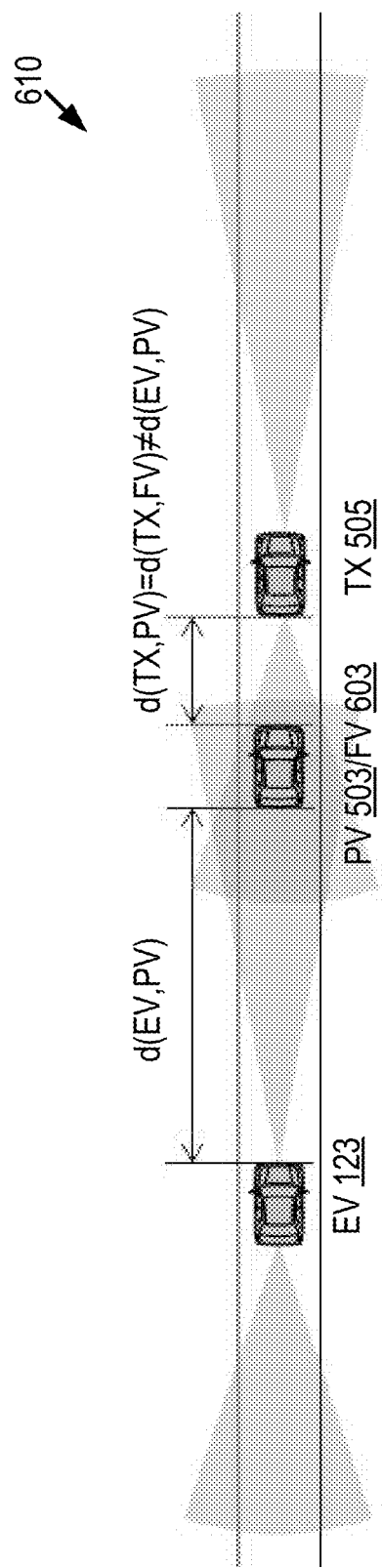
Figure 6A
Figure 6B

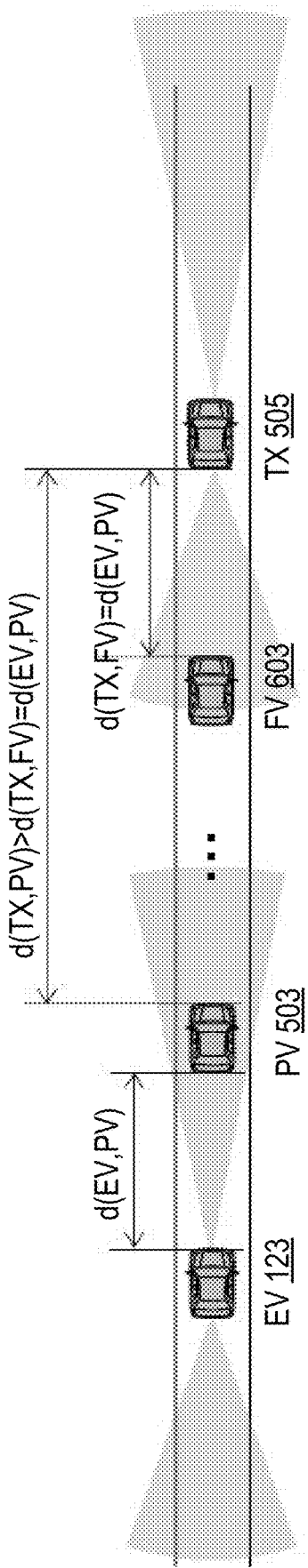
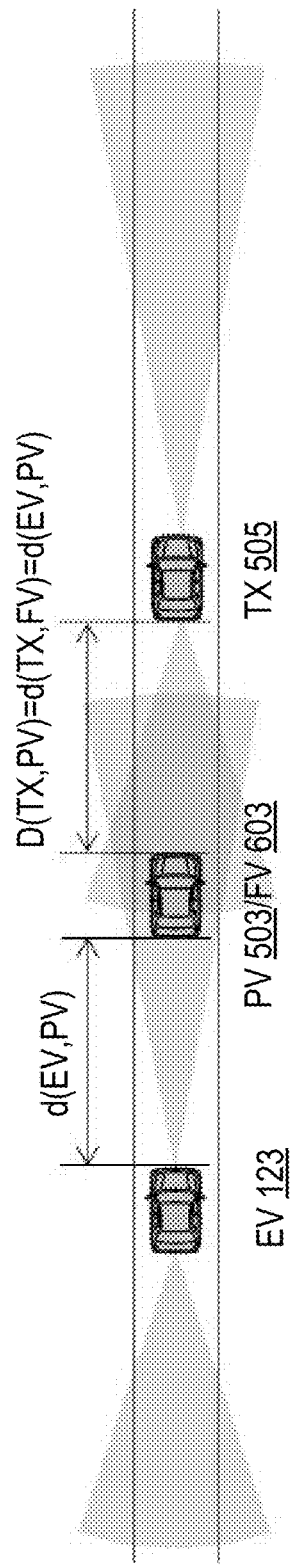
Figure 10A
Figure 10B

PROACTIVE MESSAGE TRANSMITTER IDENTIFICATION SYSTEM

BACKGROUND

The specification relates to identifying a transmitter of a Vehicle-to-Everything (V2X) message that is broadcasted in a roadway environment.

Groups of connected vehicles may communicate with one another using V2X messages to share their computing resources with one another and drive cooperatively. One form of cooperative driving with telecommunications is referred to as platooning. The connected vehicles that are members of a platoon may be referred to as "transmitters" or "receivers" depending on whether they are the transmitter or recipient of a V2X message.

SUMMARY

A problem with platooning is that receivers need to correctly identify a transmitter that sends V2X messages in a receiver's vicinity. For example, in a case where a V2X message is one indicating that a collision may occur, it is desirable for a receiving vehicle to correctly determine whether a vehicle traveling ahead of the receiving vehicle is the transmitter of the V2X message or not. However, it is currently difficult or impossible for the receiving vehicle to reliably know whether the vehicle traveling ahead is the transmitter of the V2X message.

As used herein, the term "vehicle" may refer to a connected vehicle that has the ability to transmit and receive V2X messages.

The embodiments described herein beneficially provide a system and method that is operable to modify the operation of an ego vehicle that is a receiver of a V2X message so that the ego vehicle is able to determine, from among a platoon of vehicles that are within a vicinity of the ego vehicle, which is the transmitter of the V2X message. The vehicles that are within the vicinity of the ego vehicle are referred to as "remote vehicles."

Described are embodiments of an identification client and an identification system that cooperate with one another to provide a solution for an ego vehicle that is operable to reliably determine whether a preceding vehicle is a transmitter of a V2X message. The V2X message can be a broadcast message. For example, the V2X message can be a critical message that includes safety information about a roadway environment. In some embodiments, the identification client is an element of the identification system. The identification client includes software installed in an onboard unit of a remote vehicle. The identification system includes software installed in an onboard unit of the ego vehicle.

In some embodiments, the identification client aggregates identification data describing the remote vehicle, including one or more of the following: (1) Global Positioning System (GPS) data; (2) ranging sensor data; and (3) lane data describing which lane the remote vehicle is traveling in. The identification client causes a communication unit of the remote vehicle to broadcast a V2X message including the identification data as its payload.

The ego vehicle includes a communication unit and receives the V2X message. The identification data is parsed from the V2X message and used for analysis by the identification system as described herein. In some embodiments, the identification system includes one or more of the following elements: (1) an inter-vehicle distance management module; and (2) an identification software module.

In some embodiments, the inter-vehicle distance management module includes an adaptive cruise control system that is operable to control a length of a gap between the ego vehicle and a vehicle immediately preceding the ego vehicle (i.e., an example preceding vehicle) based on one or more instructions received from the identification software module.

In some embodiments, the identification software module controls the operation of the inter-vehicle distance management module. The identification software module is operable to measure a distance between the ego vehicle and the preceding vehicle and to cause the inter-vehicle distance management module to modify the gap between the ego vehicle and the preceding vehicle so that the identification software module can determine whether the preceding vehicle is a transmitter of the V2X message (i.e., whether the preceding vehicle is the remote vehicle that transmits the V2X message).

In some embodiments, the identification software module controls an operation of the inter-vehicle distance module to ensure that a distance between the ego vehicle and the preceding vehicle satisfies a distance threshold so that the identification software module does not incorrectly identify a particular remote vehicle as being the preceding vehicle or fail to identify the particular remote vehicle as the preceding vehicle. For example, the identification software module controls the operation of the inter-vehicle distance module to ensure that the distance is not smaller than the distance threshold so that it can be reliably determined whether the preceding vehicle is the transmitter of the V2X message.

In some embodiments, if the preceding vehicle is the transmitter of the V2X message, then the identification software module may control the operation of the inter-vehicle distance management module or other Advanced Driver Assistance Systems (ADAS systems) of the ego vehicle to avoid a collision with the preceding vehicle.

By comparison to existing solutions that rely technologies that are either too unreliable or too expensive, an identification of a transmitter of a V2X message provided by embodiments described herein is reliable and not expensive as it relies on hardware that is already installed in many vehicles (e.g., standard GPS modules, standard V2X communication radios, and standard adaptive cruise control systems) and whose operation is modified by one or more of the identification system and the identification client described herein, which can be deployed cheaply and yields reliable results.

For example, different from the existing solutions, embodiments described herein may use an adaptive cruise control system (e.g., the inter-vehicle distance management module) to ensure that the distance between the ego vehicle and the preceding vehicle is wide enough (e.g., the distance satisfying a distance threshold) so that the identification software module does not incorrectly identify a particular remote vehicle as being the preceding vehicle or fail to identify the particular remote vehicle as the preceding vehicle.

In another example, different from the existing solutions, the identification software module controls the operation of the inter-vehicle distance management module (i.e., an adaptive cruise control system) by (1) measuring a distance between the ego vehicle and the preceding vehicle and (2) causing the inter-vehicle distance management module to modify the gap between the ego vehicle and the preceding vehicle so that the identification software module can reliably and cheaply determine whether the preceding vehicle is a transmitter of a V2X message (i.e., whether the preceding vehicle is the remote vehicle that transmits the V2X message).

An additional example improvement includes that no GPS noise filter is needed and GPS noise with any characteristics can be handled by embodiments described herein. Other example improvements and advantages are also possible.

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions.

One general aspect includes a method for an ego vehicle, including: modifying an operation of a communication unit of the ego vehicle to receive a V2X message that includes identification data of a transmitter of the V2X message; executing a proactive vehicle control operation on the ego vehicle to modify a distance between the ego vehicle and a preceding vehicle ahead of the ego vehicle so that the distance satisfies a distance threshold; and determining whether the preceding vehicle is the transmitter based on the identification data so that a reliable determination is achieved to improve a driving safety of the ego vehicle responsive to the distance satisfying the distance threshold. Other embodiments of this aspect include corresponding computer systems, apparatus, and computer programs recorded on one or more computer storage devices, each configured to perform the actions of the methods.

Implementations may include one or more of the following features. The method where a satisfaction of the distance threshold by the distance reduces an occurrence of a transmitter misidentification so that the preceding vehicle is reliably determined to be the transmitter or not. The method where the transmitter misidentification includes one or more of the following: a false-positive identification where the preceding vehicle is incorrectly identified as the transmitter but the preceding vehicle is actually not the transmitter; and a false-negative identification where the preceding vehicle is incorrectly identified as not being the transmitter but the preceding vehicle is actually the transmitter. The method further including: responsive to determining that the preceding vehicle is the transmitter, modifying an operation of one or more of an inter-vehicle distance management module and an Advanced Driver Assistance System (ADAS system) of the ego vehicle to avoid a collision with the preceding vehicle. The method where the inter-vehicle distance management module of the ego vehicle includes an adaptive cruise control system of the ego vehicle. The method where executing the proactive vehicle control operation on the ego vehicle to modify the distance between the ego vehicle and the preceding vehicle includes: measuring the distance between the ego vehicle and the preceding vehicle; determining whether the distance is smaller than the distance threshold; and responsive to determining that the distance being smaller than the distance threshold, modifying an operation of an inter-vehicle distance management module of the ego vehicle to control the distance between the ego vehicle and the preceding vehicle to be equal to or greater than the distance threshold. The method where determining whether the preceding vehicle is the transmitter includes: determining whether a position difference between an estimated position of the preceding vehicle and a measured position of the transmitter satisfies a position-deviation threshold; responsive to determining that the position difference satisfies the position-deviation threshold, determining a first estimated distance between the ego vehicle and the preceding vehicle and a second estimated distance between the transmitter and a following vehicle that is behind the transmitter; determining whether a distance difference between the first estimated distance and the second estimated distance satisfies a distance-deviation threshold; and responsive to determining that the distance difference satisfies the distance-deviation threshold, determining that the preceding vehicle is the transmitter. The method where: the estimated position of the preceding vehicle is determined based on a measured position of the ego vehicle and a relative position between the ego vehicle and the preceding vehicle measured by one or more ranging sensors of the ego vehicle; the first estimated distance between the ego vehicle and the preceding vehicle is a relative distance between the ego vehicle and the preceding vehicle measured by the one or more ranging sensors of the ego vehicle; and the second estimated distance between the transmitter and the following vehicle is a relative distance between the transmitter and the following vehicle that is measured by one or more ranging sensors of the transmitter and retrieved from the identification data. The method further including: determining whether the transmitter is in a same lane as the ego vehicle based on the identification data, where the proactive vehicle control operation is executed on the ego vehicle responsive to determining that the transmitter is in the same lane as the ego vehicle. The method where determining whether the preceding vehicle is the transmitter includes: applying a biased sensitivity evaluation on the preceding vehicle to determine whether the preceding vehicle is the transmitter. The method where applying the biased sensitivity evaluation on the preceding vehicle to determine whether the preceding vehicle is the transmitter includes: responsive to determining that the preceding vehicle is previously determined as not being the transmitter and suspected to be the transmitter continuously at least for a first number of times, determining that the preceding vehicle is the transmitter; or responsive to determining that the preceding vehicle is previously determined as being the transmitter and suspected to be not the transmitter continuously at least for a second number of times, determining that the preceding vehicle is not the transmitter. The method where the identification data includes one or more of the following: location data of the transmitter; ranging sensor data recorded by the transmitter; and lane data describing a lane where the transmitter is located. Implementations of the described techniques may include hardware, a method or process, or computer software on a computer-accessible medium.

One general aspect includes a system including an onboard vehicle computer system of an ego vehicle including a non-transitory memory storing computer code which, when executed by the onboard vehicle computer system, causes the onboard vehicle computer system to: modify an operation of a communication unit of the ego vehicle to receive a V2X message that includes identification data of a transmitter of the V2X message; execute a proactive vehicle control operation on the ego vehicle to modify a distance between the ego vehicle and a preceding vehicle ahead of the ego vehicle so that the distance satisfies a distance threshold; and determine whether the preceding vehicle is the transmitter based on the identification data so that a reliable determination is achieved to improve a driving safety of the ego vehicle responsive to the distance satisfying the distance threshold. Other embodiments of this aspect include corresponding computer systems, apparatus, and computer programs recorded on one or more computer storage devices, each configured to perform the actions of the methods.

Implementations may include one or more of the following features. The system where a satisfaction of the distance threshold by the distance reduces an occurrence of a transmitter misidentification so that the preceding vehicle is reliably determined to be the transmitter or not. The system where the transmitter misidentification includes one or more of the following: a false-positive identification where the preceding vehicle is incorrectly identified as the transmitter but the preceding vehicle is actually not the transmitter; and a false-negative identification where the preceding vehicle is incorrectly identified as not being the transmitter but the preceding vehicle is actually the transmitter. The system where the computer code, when executed by the onboard vehicle computer system, causes the onboard vehicle computer system further to: responsive to determining that the preceding vehicle is the transmitter, modify an operation of one or more of an inter-vehicle distance management module and an Advanced Driver Assistance System (ADAS system) of the ego vehicle to avoid a collision with the preceding vehicle. The system where the computer code, when executed by the onboard vehicle computer system, causes the onboard vehicle computer system to execute the proactive vehicle control operation on the ego vehicle to modify the distance between the ego vehicle and the preceding vehicle at least by: measuring the distance between the ego vehicle and the preceding vehicle; determining whether the distance is smaller than the distance threshold; and responsive to determining that the distance being smaller than the distance threshold, modifying an operation of an inter-vehicle distance management module of the ego vehicle to control the distance between the ego vehicle and the preceding vehicle to be equal to or greater than the distance threshold. The system where the computer code, when executed by the onboard vehicle computer system, causes the onboard vehicle computer system to determine whether the preceding vehicle is the transmitter at least by: determining whether a position difference between an estimated position of the preceding vehicle and a measured position of the transmitter satisfies a position-deviation threshold; responsive to determining that the position difference satisfies the position-deviation threshold, determining a first estimated distance between the ego vehicle and the preceding vehicle and a second estimated distance between the transmitter and a following vehicle that is behind the transmitter; determining whether a distance difference between the first estimated distance and the second estimated distance satisfies a distance-deviation threshold; and responsive to determining that the distance difference satisfies the distance-deviation threshold, determining that the preceding vehicle is the transmitter. Implementations of the described techniques may include hardware, a method or process, or computer software on a computer-accessible medium.

One general aspect may include a computer program product including a non-transitory memory of an onboard vehicle computer system of an ego vehicle storing computer-executable code that, when executed by a processor, causes the processor to: modify an operation of a communication unit of the ego vehicle to receive a V2X message that includes identification data of a transmitter of the V2X message; execute a proactive vehicle control operation on the ego vehicle to modify a distance between the ego vehicle and a preceding vehicle ahead of the ego vehicle so that the distance satisfies a distance threshold; and determine whether the preceding vehicle is the transmitter based on the identification data so that a reliable determination is achieved to improve a driving safety of the ego vehicle responsive to the distance satisfying the distance threshold. Other embodiments of this aspect include corresponding computer systems, apparatus, and computer programs recorded on one or more computer storage devices, each configured to perform the actions of the methods.

Implementations may include one or more of the following features. The computer program product where a satisfaction of the distance threshold by the distance reduces an occurrence of a transmitter misidentification so that the preceding vehicle is reliably determined to be the transmitter or not. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 6A-6C are graphical representations illustrating an identification of a transmitter of a V2X message based on ranging sensor data shared by the transmitter respectively according to some embodiments.

FIGS. 10A-10C are graphical representations illustrating a distance between a transmitter of a V2X message and a preceding vehicle respectively when the transmitter is ahead of the preceding vehicle according to some embodiments.

DETAILED DESCRIPTION

Figure 1A:
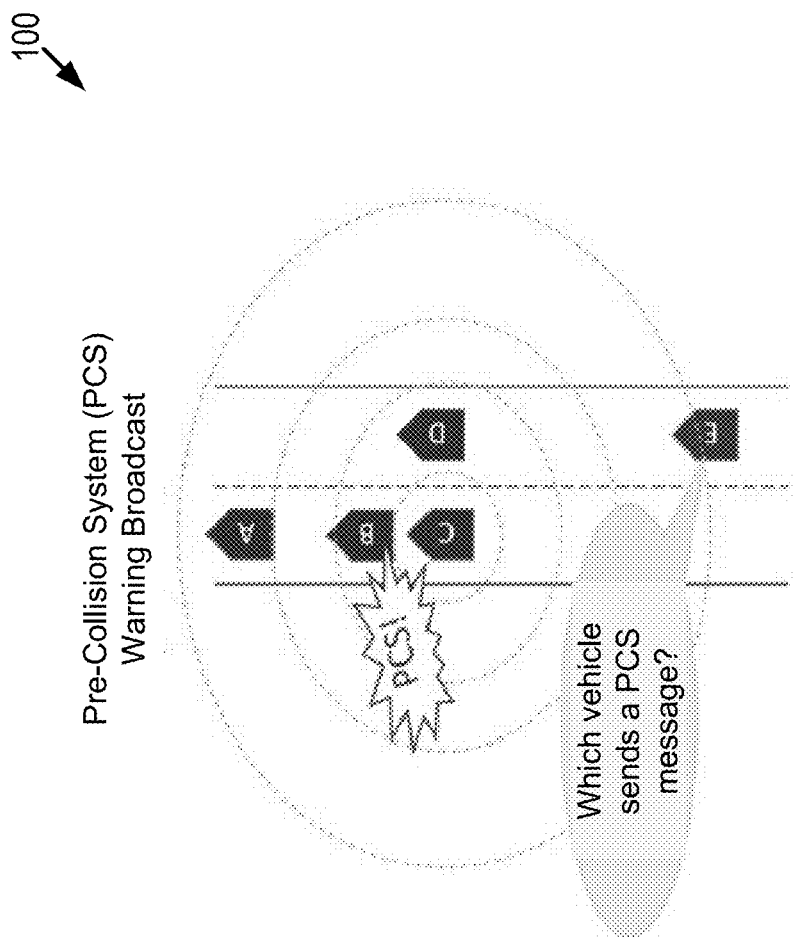
FIG. 1A is a graphical representation illustrating an application scenario for an identification system and an identification client according to some embodiments.

Embodiments of an identification system and an identification client are described herein that provide a mechanism for an ego vehicle to reliably determine whether a preceding vehicle is a transmitter of a V2X message.

In some embodiments, the identification client is an element of the identification system. The identification client includes software installed in an onboard unit of a remote vehicle. The identification system includes software installed in an onboard unit of an ego vehicle.

In some embodiments, the identification client aggregates the following identification data describing the remote vehicle: (1) GPS data; (2) ranging sensor data; and (3) lane data describing which lane the remote vehicle is traveling in.

In some embodiments, the remote vehicle includes a set of onboard sensors and a communication unit. The onboard sensors are those that are capable of measuring the information indicated above as being described by the identification data.

In some embodiments, the identification client includes code and routines that are operable, when executed by an onboard unit of the remote vehicle, to cause the onboard sensors of the remote vehicle to aggregate the identification data and to cause the communication unit to broadcast a V2X message including the identification data as its payload.

In some embodiments, the ego vehicle includes a communication unit and receives the V2X message. The identification data is parsed from the V2X message and used for analysis by the identification system as described herein.

In some embodiments, the identification system includes one or more of the following elements: (1) an inter-vehicle distance management module; and (2) an identification software module.

In some embodiments, the inter-vehicle distance management module includes an adaptive cruise control system that is operable to control a length of a gap between the ego vehicle and a vehicle immediately preceding the ego vehicle (i.e., an example of a preceding vehicle) based on instructions received from the identification software module.

In some embodiments, the identification software module controls the operation of the inter-vehicle distance management module. The identification software module is operable to measure a distance between the ego vehicle and the preceding vehicle and to cause the inter-vehicle distance management module to modify the gap between the ego vehicle and the preceding vehicle so that the identification software module can determine whether the preceding vehicle is a transmitter of the V2X message (i.e., whether the preceding vehicle is the remote vehicle that transmits the V2X message).

In some embodiments, the identification software module controls the operation of the inter-vehicle distance module to ensure that the distance between the ego vehicle and the preceding vehicle satisfies a distance threshold so that the identification software module does not incorrectly identify a particular remote vehicle as being the preceding vehicle or fail to identify the particular remote vehicle as being the preceding vehicle (see, e.g., FIG. 7 described below). For example, a satisfaction of the distance threshold by the distance between the ego vehicle and the preceding vehicle ensures that: (1) the preceding vehicle is not incorrectly identified as a transmitter of the V2X message when the preceding vehicle is actually not the transmitter; and (2) the preceding vehicle is correctly identified as the transmitter when the preceding vehicle is actually the transmitter.

In some embodiments, if the preceding vehicle is determined by the identification software module to be the transmitter of the V2X message, then the identification software module may control the operation of the inter-vehicle distance management module or other ADAS systems of the ego vehicle to avoid a collision with the preceding vehicle.

In some embodiments, each of (1) the ego vehicle that includes the identification system and (2) the remote vehicle that includes the identification client can be a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by the ADAS system of a modern vehicle require positioning information that describes the geographic position of the vehicle with lane-level accuracy. In addition, the current standard for DSRC requires that the geographic position of the vehicle be described with lane-level accuracy.

In some embodiments, devices other than vehicles (e.g., an endpoint that is not a vehicle) may be DSRC-equipped. These DSRC-equipped devices may be used to relay data to the vehicle via a DSRC message. For example, a roadside unit (RSU) or any other communication device may be DSRC-equipped if it includes one or more of the following elements: a DSRC transceiver and any software or hardware necessary to encode and transmit a DSRC message; and a DSRC receiver and any software or hardware necessary to receive and decode a DSRC message.

The embodiments described herein may use V2X communications to transmit and receive wireless messages. As described herein, examples of V2X communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mm-Wave) communication; 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X message) described herein include, but are not limited to, the following messages: a Dedicated Short Range Communication (DSRC) message; a Basic Safety Message (BSM); a Long-Term Evolution (LTE) message; a LTE-V2X message (e.g., a LTE-Vehicle-to-Vehicle (LTE-V2V) message, a LTE-Vehicle-to-Infrastructure (LTE-V2I) message, an LTE-V2N message, etc.); a 5G-V2X message; and a millimeter wave message, etc.

As used herein, the words "geographic location," "location," "geographic position" and "position" refer to a latitude and longitude of an object (or, a latitude, longitude, and elevation of an object) such as a connected vehicle. The example embodiments described herein provide positioning information that describes a geographic position of a vehicle with an accuracy of one or more of: (1) at least plus or minus 1.5 meters in relation to the actual geographic position of the vehicle in 2 dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

Example Overview

Referring to FIG. 1A, depicted is an application scenario 100 for an identification system and an identification client described herein. FIG. 1A depicts a road having two lanes in each travel direction. Five vehicles A, B, C, D and E travels in a same direction on the road. A pre-collision system (PCS) warning broadcast can be executed by any of the five vehicles if the corresponding vehicle detects a potential collision with another vehicle on the road. For example, responsive to detecting a potential collision with another vehicle (e.g., the vehicle C), the vehicle B may broadcast a V2X message indicating this potential collision (e.g., a PCS message). Responsive to receiving the V2X message, any other vehicle in the roadway environment may desire to identify a transmitter of the V2X message so that actions can be taken to prevent an occurrence of this potential collision. For example, the vehicle E in FIG. 1A may like to identify whether the transmitter of the V2X message is the vehicle D preceding itself. Similarly, the vehicle C may also like to identify whether the transmitter of the V2X message is the vehicle B preceding itself. Assume that the transmitter of the V2X message is the vehicle B. The vehicle C may take actions to avoid an occurrence of this potential collision by keeping a safe distance from the vehicle B after identifying that the vehicle B is the transmitter of the V2X message.

Figure 1B:
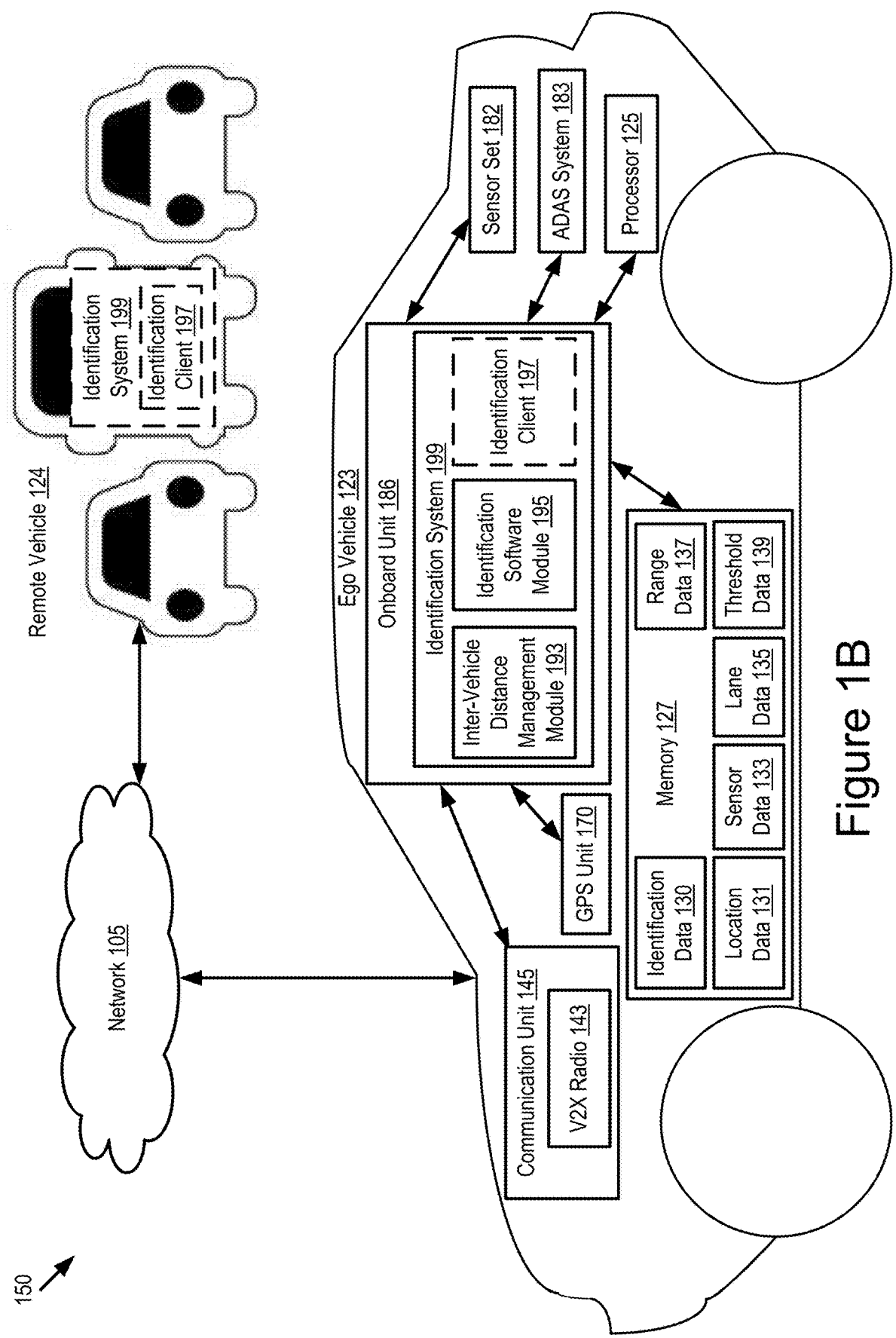
FIG. 1B is a block diagram illustrating an operating environment for an identification system and an identification client according to some embodiments.

Referring to FIG. 1B, depicted is an operating environment 150 for an identification system 199 and an identification client 197 according to some embodiments. The operating environment 150 may include one or more of the following elements: an ego vehicle 123; and one or more remote vehicles 124. These elements of the operating environment 150 may be communicatively coupled to a network 105. Although not depicted in FIG. 1B, the operating environment 150 may include one or more roadside units (RSUs) that are DSRC-enabled. The one or more DSRC-enabled RSUs may relay wireless messages among the ego vehicle 123 and the remote vehicles 124 via the network 105.

Although one ego vehicle 123, three remote vehicles 124 and one network 105 are depicted in FIG. 1B, in practice the operating environment 150 may include any number of ego vehicles 123, any number of remote vehicles 124 and any number of networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2X, LTE-D2D, VoLTE, 5G-V2X or any other mobile data network or combination of mobile data networks. Further, the network 105 may include one or more IEEE 802.11 wireless networks.

In some embodiments, the network 105 is a V2X network, which is a wireless network for sending and receiving V2X messages among various endpoints (e.g., vehicles, roadside equipment, etc.) that each include a V2X radio.

The ego vehicle 123 may be any type of vehicle. For example, the ego vehicle 123 may include one of the following types of vehicles: a car; a truck; a sports utility vehicle; a bus; a semi-truck; a drone or any other roadway-based conveyance.

In some embodiments, the ego vehicle 123 may include an autonomous vehicle or a semi-autonomous vehicle. For example, the ego vehicle 123 may include an Advanced Driver-Assistance System (e.g., an ADAS system 183) or an autonomous driving system. The ADAS system 183 or the autonomous driving system may provide some or all of the functionality that provides autonomous functionality.

The ego vehicle 123 may include one or more of the following elements: a processor 125; a memory 127; a communication unit 145; a GPS unit 170; a sensor set 182; the ADAS system 183; an onboard unit 186; and the identification system 199. These elements of the ego vehicle 123 may be communicatively coupled to one another via a bus. In some embodiments, the ego vehicle 123 may also include the identification client 197. In other embodiments, the identification client 197 is not an element of the ego vehicle 123.

In some embodiments, the processor 125 and the memory 127 may be elements of an onboard vehicle computer system (such as computer system 200 described below with reference to FIG. 2). The onboard vehicle computer system may be operable to cause or control the operation of the identification system 199. The onboard vehicle computer system may be operable to access and execute the data stored on the memory 127 to provide the functionality described herein for the identification system 199 or its elements (see, e.g., FIG. 2).

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 123 may include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The ego vehicle 123 may include one or more memories 127.

The memory 127 of the ego vehicle 123 may store one or more of the following elements: identification data 130; location data 131; sensor data 133; lane data 135; range data 137; and threshold data 139.

The identification data 130 may include one or more of the following: location data of a transmitter of a V2X message received by the ego vehicle 123; ranging sensor data recorded by the transmitter; and lane data describing a lane where the transmitter is located.

In some embodiments, the ego vehicle 123 receives a V2X message from a remote vehicle 124, where the V2X message includes identification data of the remote vehicle 124.

The location data 131 includes digital data that describes a geographic location of the ego vehicle 123 as determined by one or more onboard sensors of the ego vehicle 123. For example, the location data 131 includes GPS data describing a geographic location of the ego vehicle 123 determined by the GPS unit 170.

The sensor data 133 includes digital data describing one or more measurements recorded by one or more sensors of the sensor set 182 onboard on the ego vehicle 123. For example, the sensor data 133 includes digital data describing one or more measurements that describe a roadway environment surrounding the ego vehicle 123. In another example, the sensor data 133 may also describe information about the ego vehicle 123 such as its velocity, heading, acceleration or deceleration, etc. In yet another example, the sensor data 133 includes ranging sensor data recorded by one or more ranging sensors of the ego vehicle 123.

The lane data 135 may include digital data describing a lane where the ego vehicle 123 travels on a road.

The range data 137 may include digital data describing a range between the ego vehicle 123 and another vehicle that travels on a same road. For example, the range data 137 includes digital data describing a relative position between the ego vehicle 123 and a remote vehicle 124 that travels ahead of the ego vehicle 123.

The threshold data 139 may include digital data that describes one or more of: (i) a distance threshold that a distance between the ego vehicle 123 and a vehicle preceding the ego vehicle 123 ("preceding vehicle") needs to satisfy (see, e.g., FIG. 7); (ii) a position-deviation threshold that is related to a position difference between a position of the preceding vehicle and a position of a transmitter of a V2X message (see, e.g., FIGS. 5A-5C); and (iii) a distance-deviation threshold that is related to a distance difference between (1) a first estimated distance between the ego vehicle 123 and the preceding vehicle and (2) a second estimated distance between the transmitter and a following vehicle that is behind the transmitter ("following vehicle") (see, e.g., FIGS. 6A-6C).

Here, a vehicle that travels ahead of the ego vehicle 123 may be referred to as a "preceding vehicle." For example, the preceding vehicle may be a vehicle that travels immediately ahead of the ego vehicle 123 on a same lane. In another example, the preceding vehicle may be a vehicle that travels ahead of the ego vehicle 123 on a left lane or a right lane of the ego vehicle 123. A vehicle that travels behind the transmitter may be referred to as a "following vehicle." For example, the following vehicle may be a vehicle that travels immediately after the transmitter on a same lane. In another example, the following vehicle may be a vehicle that travels after the transmitter on a left lane or a right lane of the transmitter.

The communication unit 145 transmits and receives data to and from a network 105 or to another communication channel. In some embodiments, the communication unit 145 may include a DSRC transceiver, a DSRC receiver and other hardware or software necessary to make the ego vehicle 123 a DSRC-enabled device. For example, the communication unit 145 includes a DSRC antenna configured to broadcast DSRC messages via the network. The DSRC antenna may also transmit BSM messages at a fixed or variable interval (e.g., every 0.1 seconds, at a time interval corresponding to a frequency range from 1.6 Hz to 10 Hz, etc.) that is user configurable.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The communication unit 145 includes a V2X radio 143. The V2X radio 143 is an electronic device that includes a V2X transmitter and a V2X receiver and is operable to send and receive wireless messages via any V2X protocol. For example, the V2X radio 143 is operable to send and receive wireless messages via DSRC. The V2X transmitter is operable to transmit and broadcast DSRC messages over the 5.9 GHz band. The V2X receiver is operable to receive DSRC messages over the 5.9 GHz band.

In some embodiments, the GPS unit 170 is a conventional GPS unit of the ego vehicle 123. For example, the GPS unit 170 may include hardware that wirelessly communicates with a GPS satellite to retrieve data that describes a geographic location of the ego vehicle 123. For example, the GPS unit 170 retrieves GPS data describing the geographic location of the ego vehicle 123 from one or more GPS satellites. In some embodiments, the GPS unit 170 is a DSRC-compliant GPS unit of the ego vehicle 123 that is operable to provide GPS data describing the geographic location of the ego vehicle 123 with lane-level accuracy.

The sensor set 182 includes one or more sensors that are operable to measure a roadway environment outside of the ego vehicle 123. For example, the sensor set 182 may include one or more sensors that record one or more physical characteristics of the roadway environment that is proximate to the ego vehicle 123. The memory 127 may store sensor data that describes the one or more physical characteristics recorded by the sensor set 182. The roadway environment outside of the ego vehicle 123 may include the remote vehicle 124, and so, one or more of the sensors of the sensor set 182 may record sensor data that describes information about the remote vehicle 124.

In some embodiments, the sensor set 182 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

In some embodiments, the sensor set 182 includes any sensors that are operable to record digital data describing the environment of the ego vehicle 123, and optionally locations of stop signs, traffic signals or a combination thereof within an intersection and locations of other endpoints (e.g., the remote vehicle 124) as well as their velocities, heading, and acceleration or deceleration over time. For example, the sensor set 182 may include range finding and position locating sensors such as LIDAR, radar, and GPS, as well as any other sensors. The sensor data recorded by the sensor set 182 describes one or more roadway measurements by the sensor set 182. The sensor data may also describe information about the ego vehicle 123 and the remote vehicle 124 such as their velocities, heading, acceleration or deceleration, etc.

In some embodiments, the ADAS system 183 is a conventional ADAS system that controls operation of the ego vehicle 123. Alternatively, or additionally, the ego vehicle 123 may include an autonomous driving system (not depicted in FIG. 1B). In some embodiments, the ADAS system 183 may also include any software or hardware included in the ego vehicle 123 that makes the ego vehicle 123 an autonomous vehicle or a semi-autonomous vehicle.

Examples of the ADAS system 183 may include one or more of the following elements of the ego vehicle 123: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

The onboard unit 186 may be a computing device onboard on the ego vehicle 123. For example, the onboard unit 186 includes an ECU. The ECU is an embedded system in automotive electronics that controls one or more of electrical systems or subsystems in the ego vehicle 123. Types of the ECU include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the ego vehicle 123 may include multiple onboard units 186 (e.g., multiple ECUs). In some embodiments, the identification system 199 may be an element of the onboard unit 186.

In some embodiments, the identification system 199 includes software that is operable, when executed by the processor 125, to cause the processor 125 to execute one or more steps of methods 300 and 400 described below with reference to FIGS. 3-4B and one or more operations described below with reference to FIGS. 5A-13C.

In some embodiments, the identification system 199 may be implemented using hardware including a field-programmable gate array ("FPGA") or an application-specific integrated circuit ("ASIC"). In some other embodiments, the identification system 199 may be implemented using a combination of hardware and software. The identification system 199 may be stored in a combination of the devices (e.g., servers or other devices), or in one of the devices.

In some embodiments, the identification system 199 includes an inter-vehicle distance management module 193, an identification software module 195 and the identification client 197. The inter-vehicle distance management module 193 includes an adaptive cruise control system that is modified to operate in accordance with instructions received from the identification software module 195. In some embodiments, the identification software module 195 includes code and routines that are operable, when executed by the processor 125, to cause the processor 125 to execute one or more steps shown in FIGS. 3 and 4A-4B.

The identification system 199 (including the inter-vehicle distance management module 193 and the identification software module 195) is described in more detail below with reference to FIGS. 2-13C.

In some embodiments, the ego vehicle 123 and the remote vehicle 124 may have a similar structure, and the description provided for the ego vehicle 123 may also be applicable to the remote vehicle 124.

In some embodiments, at least one remote vehicle 124 is a connected vehicle like the ego vehicle 123. In some embodiments, at least one remote vehicle 124 is an unconnected vehicle. The remote vehicle 124 includes elements that are similar to those of the ego vehicle 123 including, for example, the sensors and the V2X radio. In some embodiments, the remote vehicle 124 includes its own instance of the identification system 199 and the identification client 197 (depicted using dash-line boxes in FIG. 1B). In some embodiments, each remote vehicle 124 includes at least an instance of the identification client 197.

In some embodiments, the identification client 197 of the remote vehicle 124 includes software that is operable, when executed by a processor of the remote vehicle 124, to cause the processor to aggregate identification data associated with the remote vehicle 124. The identification client 197 of the remote vehicle 124 may broadcast a V2X message including the identification data if the remote vehicle 124 detects a potential collision that is likely to occur between the remote vehicle 124 and another vehicle (e.g., a following vehicle that travels after the remote vehicle 124). Here, this remote vehicle 124 is a transmitter of the V2X message.

In some embodiments, the identification client 197 may be implemented using hardware including a field-programmable gate array ("FPGA") or an application-specific integrated circuit ("ASIC"). In some other embodiments, the identification client 197 may be implemented using a combination of hardware and software. The identification client 197 may be stored in a combination of the devices (e.g., servers or other devices), or in one of the devices.

Example Computer System

Figure 2:
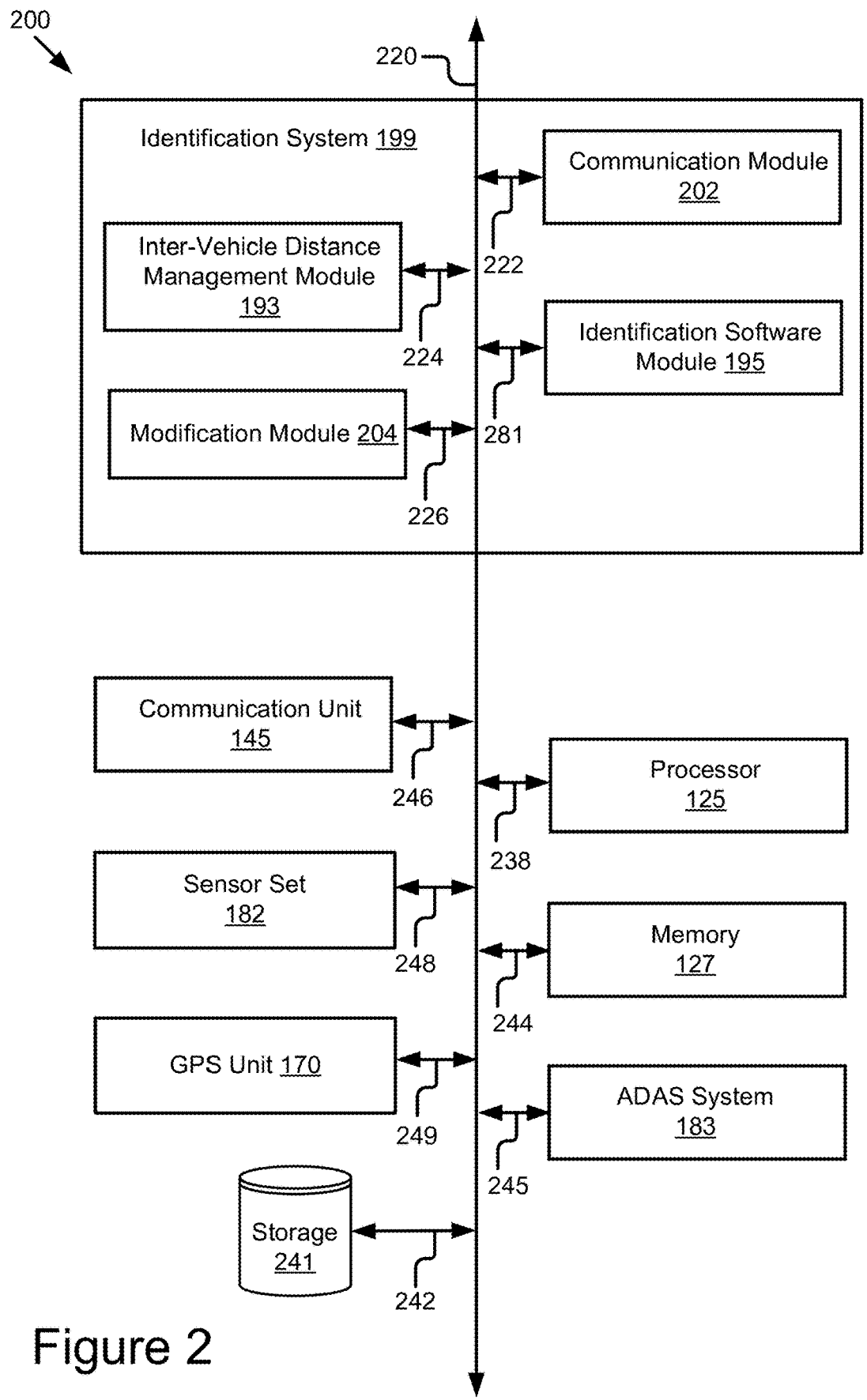
FIG. 2 is a block diagram illustrating an example computer system including an identification system according to some embodiments.

Referring now to FIG. 2, depicted is a block diagram illustrating an example computer system 200 including the identification system 199 according to some embodiments. In some embodiments, the computer system 200 may include a special-purpose computer system that is programmed to perform one or more steps of methods 300 and 400 described below with reference to FIGS. 3-4B.

In some embodiments, the computer system 200 may be an element of the ego vehicle 123. In some embodiments, the computer system 200 may be an onboard vehicle computer of the ego vehicle 123. In some embodiments, the computer system 200 may include an engine control unit, head unit or some other processor-based computing device of the ego vehicle 123.

The computer system 200 may include one or more of the following elements according to some examples: the identification system 199; the processor 125; the communication unit 145; the sensor set 182; the GPS unit 170; the memory 127; the ADAS system 183; and a storage 241. The components of the computer system 200 are communicatively coupled by a bus 220.

In the illustrated embodiment, the processor 125 is communicatively coupled to the bus 220 via a signal line 238. The communication unit 145 is communicatively coupled to the bus 220 via a signal line 246. The sensor set 182 is communicatively coupled to the bus 220 via a signal line 248. The GPS unit 170 is communicatively coupled to the bus 220 via a signal line 249. The storage 241 is communicatively coupled to the bus 220 via a signal line 242. The memory 127 is communicatively coupled to the bus 220 via a signal line 244. The ADAS system 183 is communicatively coupled to the bus 220 via a signal line 245.

The following elements of the computer system 200 are described above with reference to FIG. 1B, and so, those descriptions will not be repeated here: the processor 125; the communication unit 145; the sensor set 182; the GPS unit 170; the ADAS system 183; and the memory 127.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the identification system 199 includes: a communication module 202; the inter-vehicle distance management module 193; the identification software module 195; and a modification module 204. These components of the identification system 199 are communicatively coupled to each other via the bus 220. In some embodiments, components of the identification system 199 can be stored in a single server or device. In some other embodiments, components of the identification system 199 can be distributed and stored across multiple servers or devices. For example, some of the components of the identification system 199 may be distributed across the remote vehicle 124 and the ego vehicle 123.

The communication module 202 can be software including routines for handling communications between the identification system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 150. For example, the communication module 202 receives or transmits, via the communication unit 145, a V2X message. The communication module 202 may send or receive any of the data or messages described above with reference to FIGS. 1A-1B via the communication unit 145.

In some embodiments, the communication module 202 receives data from components of the identification system 199 and stores the data in one or more of the storage 241 and the memory 127. For example, the communication module 202 receives any of the data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the identification system 199. For example, the communication module 202 may handle communications among the inter-vehicle distance management module 193, the identification software module 195 and the modification module 204. Any of these modules may cause the communication module 202 to communicate with the other elements of the computer system 200 or the operating environment 150 (via the communication unit 145). For example, the identification software module 195 may use the communication module 202 to communicate with the sensor set 182 and cause the sensor set 182 to record sensor data.

The inter-vehicle distance management module 193 can include software including routines for controlling the ego vehicle 123 to modify a distance between the ego vehicle 123 and another vehicle. In some embodiments, the inter-vehicle distance management module 193 can be stored in the memory 127 of the computer system 200 and can be accessible and executable by the processor 125. The inter-vehicle distance management module 193 may be adapted for cooperation and communication with the processor 125 and other components of the computer system 200 via a signal line 224.

In some embodiments, the inter-vehicle distance management module 193 may also include hardware for controlling the ego vehicle 123 to modify a distance between the ego vehicle 123 and another vehicle (e.g., a preceding vehicle ahead of the ego vehicle 123).

In some embodiments, the inter-vehicle distance management module 193 is an adaptive cruise control system that is operable to control a distance between the ego vehicle 123 and the preceding vehicle based on one or more instructions received from the identification software module 195. For example, the inter-vehicle distance management module 193 may reduce a speed of the ego vehicle 123 automatically so that the distance between the ego vehicle 123 and the preceding vehicle becomes greater and satisfies a distance threshold (e.g., the distance becomes equal to or greater than the distance threshold).

The identification software module 195 can be software including routines that, when executed by the processor 125, cause the processor 125 to determine whether the preceding vehicle ahead of the ego vehicle 123 is a transmitter of a V2X message. In some embodiments, the identification software module 195 can be a set of instructions stored in the memory 127 of the computer system 200 and can be accessible and executable by the processor 125. The identification software module 195 may be adapted for cooperation and communication with the processor 125 and other components of the computer system 200 via a signal line 281.

In some embodiments, the identification software module 195 is operable to operate one or more sensors of the sensor set 182 to generate sensor data describing the measurements of the sensor set 182 onboard on the ego vehicle 123. The identification software module 195 may cause the sensor data to be stored in the memory 127. Specifically, the identification software module 195 may operate one or more sensors included in the sensor set 182 to record sensor data describing measurements of a physical environment proximate to the computer system 200. For example, the identification software module 195 may operate one or more ranging sensors of the ego vehicle 123 to generate ranging sensor data of the ego vehicle 123.

In some embodiments, the identification software module 195 may cause the GPS unit 170 to retrieve positional information for the computer system 200. For example, the identification software module 195 may cause the GPS unit 170 to retrieve location data (e.g., GPS data) describing the geographic location of the ego vehicle 123.

In some embodiments, the identification software module 195 receives a V2X message via the V2X radio 143. The V2X message can be a broadcast message. For example, the identification software module 195 causes the modification module 204 to modify an operation of the communication unit 145 of the ego vehicle 123 to receive the V2X message. The V2X message includes identification data of a remote vehicle 124 that is a transmitter of the V2X message. The identification data includes one or more of the following elements: location data describing a location of the transmitter; ranging sensor data recorded by the transmitter; and lane data describing a lane where the transmitter is located.

In some embodiments, the identification software module 195 may perform one or more of the following procedures (1)-(5) to determine whether a preceding vehicle ahead of the ego vehicle 123 is the transmitter of the V2X message: (1)—a judgment based at least on the lane data of the transmitter (e.g., a transmitter-lane-data-based judgment); (2)—a proactive vehicle control; (3)—a judgment based at least on the location data of the transmitter (e.g., a transmitter-location-data-based judgment); (4)—a judgment based at least on ranging sensor data of the transmitter (e.g., a transmitter-ranging-sensor-data-based judgment); and (5)—a biased sensitivity evaluation. These procedures are described below in more detail.

In some embodiments, the identification software module 195 may perform procedure (1) (e.g., the transmitter-lane-data-based judgment) to determine whether the transmitter is in a same lane as the ego vehicle 123 based on the identification data. For example, the identification software module 195 determines (i) a first lane where the transmitter travels based on the lane data included in the identification data and (ii) a second lane where the ego vehicle 123 travels based on sensor data recorded by the ego vehicle 123. The identification software module 195 compares the first lane with the second lane to determine whether they are identical to one another.

Responsive to determining that the transmitter is not in the same lane as the ego vehicle 123, the identification software module 195 may determine that the preceding vehicle ahead of the ego vehicle 123 is not the transmitter of the V2X message.

On the other hand, responsive to determining that the transmitter is in the same lane as the ego vehicle 123, the identification software module 195 may perform procedure (2) (e.g., the proactive vehicle control) at least by: executing a proactive vehicle control operation on the ego vehicle 123 to modify a distance between the ego vehicle 123 and the preceding vehicle ahead of the ego vehicle 123 so that the distance satisfies a distance threshold.

Specifically, the identification software module 195 measures the distance between the ego vehicle 123 and the preceding vehicle and determines whether the distance is smaller than the distance threshold. Responsive to determining that the distance is smaller than the distance threshold, the identification software module 195 may modify an operation of the inter-vehicle distance management module 193 of the ego vehicle 123 to control the distance between the ego vehicle 123 and the preceding vehicle so that the distance becomes equal to or greater than the distance threshold. For example, the identification software module 195 may generate one or more instructions to modify an operation of the inter-vehicle distance management module 193. Then, responsive to receiving the one or more instructions from the identification software module 195, the inter-vehicle distance management module 193 may reduce a speed of the ego vehicle 123 to increase the distance between the ego vehicle 123 and the preceding vehicle so that the distance becomes equal to or greater than the distance threshold.

On the other hand, responsive to determining that the distance is equal to or greater than the distance threshold, the identification software module 195 may proceed to perform one or more of procedure (3), procedure (4) and procedure (5) to determine whether the preceding vehicle is the transmitter as described below in more detail.

In some embodiments, the distance threshold can be determined based on one or more of: a measurement error of the location data (e.g., a measurement error of GPS location data represented as "$E_{gps}$"); a measurement error of the ranging sensor data; and a ranging sensor range, etc. An analysis of the distance threshold is provided below in more detail with reference to FIGS. 8A-10C. As described below, it is desirable to have the distance between the ego vehicle 123 and the preceding vehicle d(EV,PV) to be greater than $4E_{gps}$ (e.g., d(EV,PV)>$4E_{gps}$), and so, the distance threshold here can be configured to be at least $4E_{gps}$. For example, assume that $E_{gps}$=10 m. Then, the distance threshold is at least 40 m. Throughout the disclosure, d(A,B) is defined to represent a distance between a vehicle A and a vehicle B for ease of discussion.

After executing procedure (2) (e.g., the proactive vehicle control), the identification software module 195 determines whether the preceding vehicle is the transmitter based on the identification data so that a reliable determination is achieved to improve a driving safety of the ego vehicle 123 responsive to the distance satisfying the distance threshold. For example, the identification software module 195 may continue to perform one or more of procedure (3) (e.g., the transmitter-location-data-based judgment), procedure (4) (e.g., the transmitter-ranging-sensor-data-based judgment) and procedure (5) (e.g., the biased sensitivity evaluation) to determine whether the preceding vehicle is the transmitter.

Here, a satisfaction of the distance threshold by the distance performed at procedure (2) described above reduces an occurrence of a transmitter misidentification so that the preceding vehicle is reliably determined to be the transmitter or not (see, e.g., FIG. 7 below). The transmitter misidentification includes one or more of the following: a false-positive identification where the preceding vehicle is incorrectly identified as the transmitter, but the preceding vehicle is actually not the transmitter; and a false-negative identification where the preceding vehicle is incorrectly identified as not being the transmitter, but the preceding vehicle is actually the transmitter.

Turning to an execution of procedure (3) (e.g., the transmitter-location-data-based judgment), the identification software module 195 determines a relative position between the ego vehicle 123 and the preceding vehicle based on ranging sensor data measured by one or more ranging sensors of the ego vehicle 123. The identification software module 195 determines an estimated position of the preceding vehicle based on a measured position of the ego vehicle 123 and the relative position between the ego vehicle 123 and the preceding vehicle (e.g., the estimated position of the preceding vehicle=the measured position of the ego vehicle 123+the relative position between the ego vehicle 123 and the preceding vehicle). The measured position of the ego vehicle 123 can be, for example, a GPS position of the ego vehicle 123 measured by the GPS unit 170.

The identification software module 195 determines a position difference between (i) the estimated position of the preceding vehicle and (ii) a measured position of the transmitter (e.g., the position difference=a distance between the estimated position of the preceding vehicle and the measured position of the transmitter). The measured position of the transmitter can be, for example, a GPS position of the transmitter described by the location data of the transmitter.

The identification software module 195 determines whether the position difference satisfies a position-deviation threshold. Responsive to determining that the position difference does not satisfy the position-deviation threshold (e.g., the position difference being greater than the position-deviation threshold), the identification software module 195 may determine that the preceding vehicle is not the transmitter. On the other hand, responsive to determining that the position difference satisfies the position-deviation threshold (e.g., the position difference being not greater than the position-deviation threshold): (i) the identification software module 195 may determine that the preceding vehicle is the transmitter; or, (ii) the identification software module 195 may continue to perform other procedures (e.g., procedure (4), procedure (5)) before determining whether the preceding vehicle is the transmitter.

In some embodiments, the position-deviation threshold can be determined based on one or more of: a measurement error of the location data (e.g., a measurement error of GPS location data); and a measurement error of the ranging sensor data, etc. A measured GPS position can have a measurement error (e.g., $E_{gps}$) of 10 meters or more while a measured relative position based on the ranging sensors can have a measurement error (e.g., $E_{rs}$) in a centimeter order or less. Therefore, the measurement error based on the ranging sensors is negligible compared to the measurement error of the GPS position. From the above description, it can be shown that the calculation of the position difference involves the measured GPS position of the transmitter, the measured GPS position of the ego vehicle 123 and the measured relative position between the ego vehicle 123 and the preceding vehicle. Thus, the calculation of the position difference involves two GPS measurement errors and one ranging-sensor measurement error. The position-deviation threshold can be determined to be a sum of two GPS measurement errors and one ranging-sensor measurement error. For example, it can be determined that: the position-deviation threshold=$2 \times E_{gps}+E_{rs}$. Since $E_{rs}$ is negligible compared to $E_{gps}$, then it can be determined that: the position-deviation threshold=$2 \times E_{gps}$. In a further example, assume that $E_{gps}$=10 m. Then the position-deviation threshold=20 m.

Examples illustrating an execution of procedure (3) (e.g., the transmitter-location-data-based judgment) are provided in FIGS. 5A-5C, which are described below in more detail.

Turning to an execution of procedure (4) (e.g., the transmitter-ranging-sensor-data-based judgment), the identification software module 195 determines whether there is any following vehicle behind the transmitter based on the transmitter's ranging sensor data retrieved from the identification data. For example, the identification software module 195 analyzes the ranging sensor data included in the identification data transmitted by the transmitter to determine whether the transmitter detects a following vehicle traveling behind it.

Responsive to determining that there is no following vehicle behind the transmitter (e.g., there is no following vehicle within a sensing range of the transmitter's ranging sensors), the identification software module 195 confirms that the transmitter does not detect any vehicle behind.

Responsive to determining that there is a following vehicle behind the transmitter (e.g., there is a following vehicle within a sensing range of the transmitter's ranging sensors), the identification software module 195 confirms that the transmitter detects a following vehicle behind. The identification software module 195 determines a first estimated distance between the ego vehicle 123 and the preceding vehicle. For example, the first estimated distance between the ego vehicle 123 and the preceding vehicle is a relative distance between the ego vehicle 123 and the preceding vehicle, where the identification software module 195 determines this relative distance based on ranging sensor data recorded by one or more ranging sensors of the ego vehicle 123.

The identification software module 195 determines a second estimated distance between the transmitter and the following vehicle. For example, the second estimated distance between the transmitter and the following vehicle is a relative distance between the transmitter and the following vehicle, and this relative distance is measured by one or more ranging sensors of the transmitter. The identification software module 195 retrieves data describing this relative distance from the identification data included in the received V2X message.

The identification software module 195 determines a distance difference between the first estimated distance and the second estimated distance and determines whether the distance difference satisfies a distance-deviation threshold. Responsive to determining that the distance difference does not satisfy the distance-deviation threshold (e.g., the distance difference being greater than the distance-deviation threshold), the identification software module 195 may determine that the preceding vehicle is not the transmitter.

On the other hand, responsive to determining that the distance difference satisfies the distance-deviation threshold (e.g., the distance difference being not greater than the distance-deviation threshold): (i) the identification software module 195 may determine that the preceding vehicle is the transmitter; or, (ii) the identification software module 195 may continue to perform other procedures (e.g., procedure (5)) before determining whether the preceding vehicle is the transmitter.

In some embodiments, the distance-deviation threshold can be determined based on a measurement error of the ranging sensor data. From the above description, it can be shown that the calculation of the distance difference involves (1) the relative distance between the ego vehicle 123 and the preceding vehicle measured by one or more ranging sensors of the ego vehicle 123 and (2) the relative distance between the transmitter and the following vehicle measured by one or more ranging sensors of the transmitter. Thus, the calculation of the distance difference involves two ranging-sensor measurement errors (e.g., $2 \times E_{rs}$). The distance-deviation threshold can be determined to be a sum of two ranging-sensor measurement errors (e.g., the distance-deviation threshold=$2 \times E_{rs}$). For example, it is known that each measured relative position based on the ranging sensor data can have a measurement error in a centimeter order or less. To be conservative, assume that $E_{rs}$=0.5 m. Then the distance-deviation threshold=$2 \times E_{rs}$=1 m.

Examples illustrating an execution of procedure (4) (e.g., the transmitter-ranging-sensor-data-based judgment) are provided in FIGS. 6A-6C, which are described below in more detail.

Turning to an execution of procedure (5) (e.g., the biased sensitivity evaluation), the identification software module 195 applies a biased sensitivity evaluation on the preceding vehicle to determine whether the preceding vehicle is the transmitter. In some embodiments, procedure (5) is executed if one or more of the above procedures (1)-(4) indicate that the preceding vehicle is likely to be the transmitter. Procedure (5) is not executed if any of the above procedures (1)-(4) indicates that the preceding vehicle is not the transmitter.

Specifically, procedure (5) is executed if one or more of the following conditions are already satisfied: (i) at procedure (1) (e.g., the transmitter-lane-data-based judgment), the transmitter is determined to be on the same lane as the ego vehicle 123; (ii) at procedure (2) (e.g., the proactive vehicle control), the distance between the ego vehicle 123 and the preceding vehicle is modified to satisfy the distance threshold; (iii) at procedure (3) (e.g., the transmitter-location-data-based judgment), the position distance between the estimated position of the preceding vehicle and the measured position of the transmitter satisfies the position-deviation threshold; or (iv) at procedure (4) (e.g., the transmitter-ranging-sensor-data-based judgment), the distance difference between the first estimated distance and the second estimated distance satisfies the distance-deviation threshold.

For example, if one or more of the above conditions (i)-(iv) are already satisfied (indicating that the preceding vehicle is likely to be the transmitter), the identification software module 195 determines whether the preceding vehicle is previously determined as not being the transmitter and suspected to be the transmitter continuously at least for a first number of times. Responsive to determining that the preceding vehicle is previously determined as not being the transmitter and suspected to be the transmitter continuously at least for the first number of times, the identification software module 195 determines that the preceding vehicle is the transmitter. For example, if the preceding vehicle is previously recognized as not being the transmitter and suspected to be as the transmitter continuously twice, the identification software module 195 identifies the preceding vehicle as the transmitter.

In another example, if one or more of the above conditions (i)-(iv) are already satisfied (indicating that the preceding vehicle is likely to be the transmitter), the identification software module 195 determines whether the preceding vehicle is previously determined as being the transmitter and suspected to be not the transmitter continuously at least for a second number of times. Responsive to determining that the preceding vehicle is previously determined as being the transmitter and suspected to be not the transmitter continuously at least for the second number of times, the identification software module 195 determines that the preceding vehicle is not the transmitter. For example, if the preceding vehicle is previously recognized as the transmitter and suspected to be as not being the transmitter continuously 10 times, the identification software module 195 identifies the preceding vehicle as not being the transmitter.

The modification module 204 can be software including routines that, when executed by the processor 125, cause the processor 125 to modify an operation of the ego vehicle 123.

In some embodiments, the modification module 204 can be stored in the memory 127 of the computer system 200 and can be accessible and executable by the processor 125. The modification module 204 may be adapted for cooperation and communication with the processor 125 and other components of the computer system 200 via a signal line 226.

In some embodiments, the modification module 204 modifies an operation of the communication unit 145 of the ego vehicle 123 to receive a V2X message that includes identification data of a transmitter of the V2X message. For example, the modification module 204 modifies one or more operation elements of the communication unit 145 to receive the V2X message via the communication unit 145.

In some embodiments, the one or more operation elements of the communication unit 145 includes one or more of the following: one or more active V2X channels to be operated on the communication unit 145; one or more active V2X radios to be operated on the communication unit 145; one or more active V2X antennas to be operated on the communication unit 145; one or more operating frequencies of the one or more active V2X channels; one or more beamforming techniques performed on the one or more active V2X antennas; and a bandwidth allocation scheme of the communication unit 145.

For example, when receiving the V2X message, the modification module 204 can modify one or more of the following operation elements of the communication unit 145: (1) increasing the number of active V2X channels so that more V2X channels can be used to communicate with other nearby vehicles (e.g., remote vehicles 124) simultaneously; (2) changing a beamforming technique applied on one or more V2X antennas so that a signal transmitted to a nearby vehicle with a farther distance may have a higher signal strength; and (3) allocating more bandwidth to the communication unit 145 so that data can be exchanged with other nearby vehicles with a faster speed. In this way, communication efficiency of the ego vehicle 123 can be improved.

In some embodiments, responsive to determining that the preceding vehicle is the transmitter, the modification module 204 may modify an operation of one or more of the inter-vehicle distance management module 193 (e.g., an adaptive cruise control system) and the ADAS system 183 of the ego vehicle 123 to avoid a collision with the preceding vehicle. For example, the modification module 204 may modify an operation of the inter-vehicle distance management module 193 to reduce a speed of the ego vehicle 123 to avoid a collision with the preceding vehicle. In another example, the modification module 204 may modify an operation of the ADAS system 183 to change a lane of the ego vehicle 123 to avoid a collision with the preceding vehicle.

Example Processes

Figure 3:
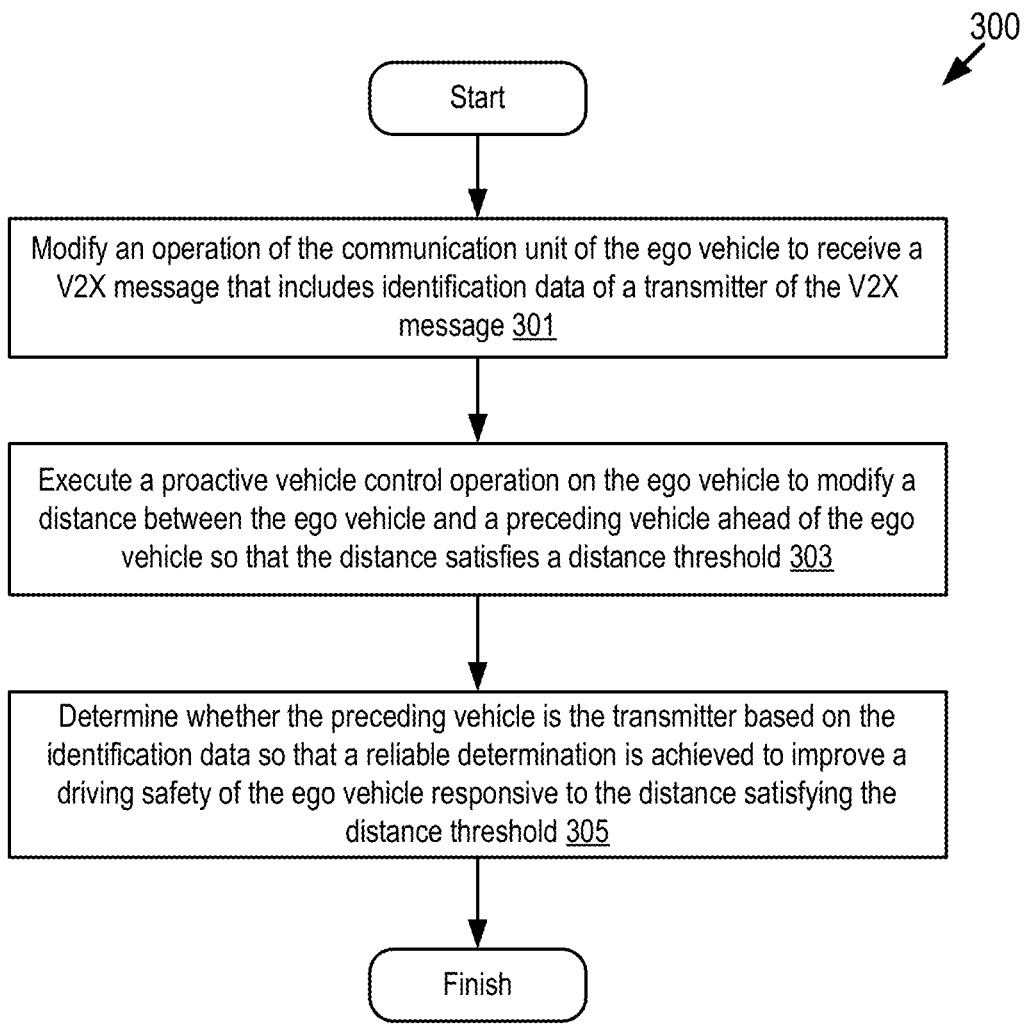
FIG. 3 depicts a method for identifying a transmitter of a V2X message according to some embodiments.

Referring now to FIG. 3, depicted is a flowchart of an example method 300 for identifying a transmitter of a V2X message according to some embodiments. The steps of the method 300 are executable in any order, and not necessarily the order depicted in FIG. 3.

At step 301, the modification module 204 modifies an operation of the communication unit 145 of the ego vehicle 123 to receive a V2X message that includes identification data of a transmitter of the V2X message.

At step 303, the identification software module 195 executes a proactive vehicle control operation on the ego vehicle 123 to modify a distance between the ego vehicle 123 and a preceding vehicle ahead of the ego vehicle 123 so that the distance satisfies a distance threshold.

At step 305, the identification software module 195 determines whether the preceding vehicle is the transmitter based on the identification data so that a reliable determination is achieved to improve a driving safety of the ego vehicle 123 responsive to the distance satisfying the distance threshold.

Figure 4A:
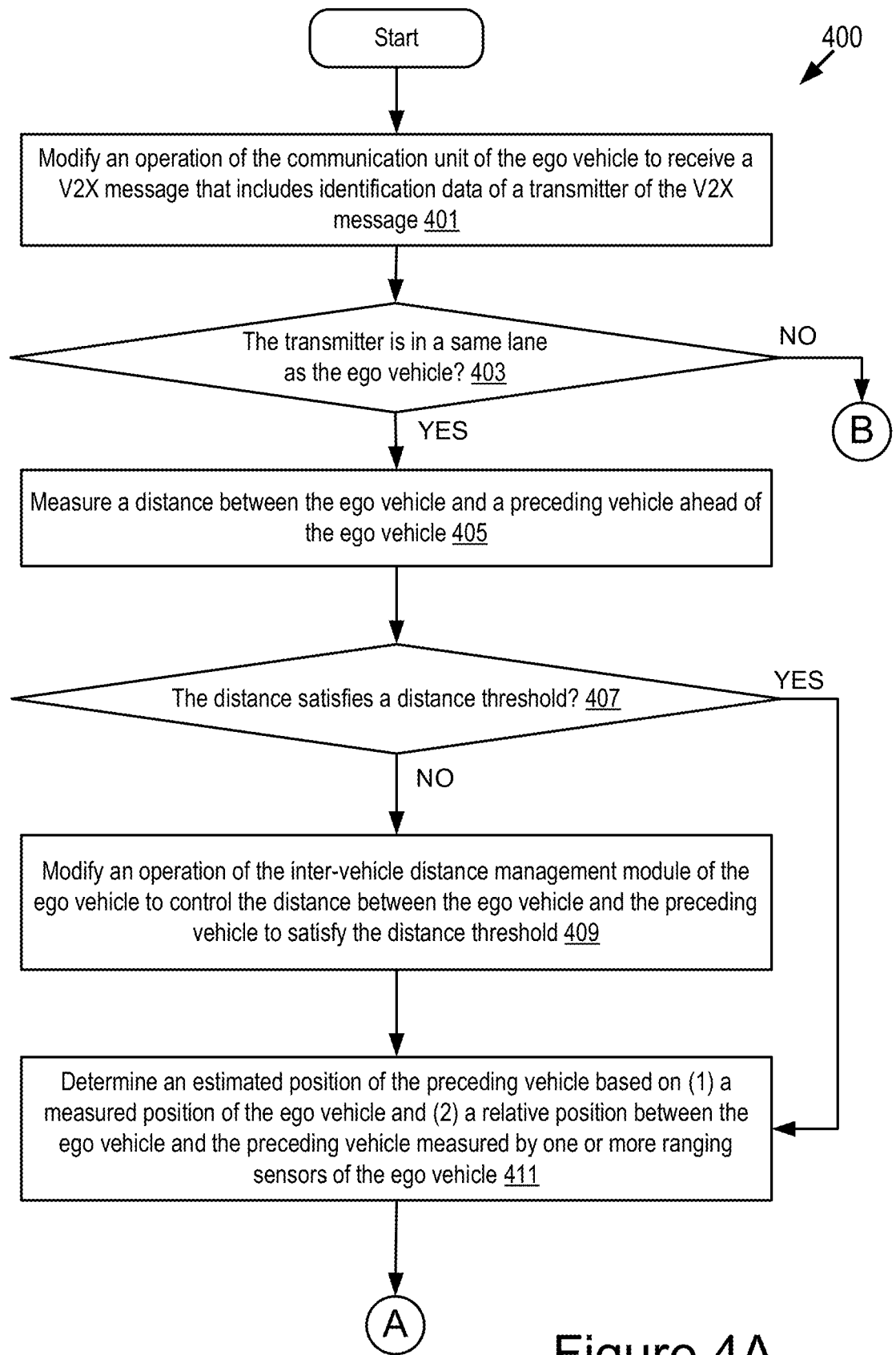
FIGS. 4A-4B depict another method for identifying a transmitter of a V2X message according to some embodiments.
Figure 4B:
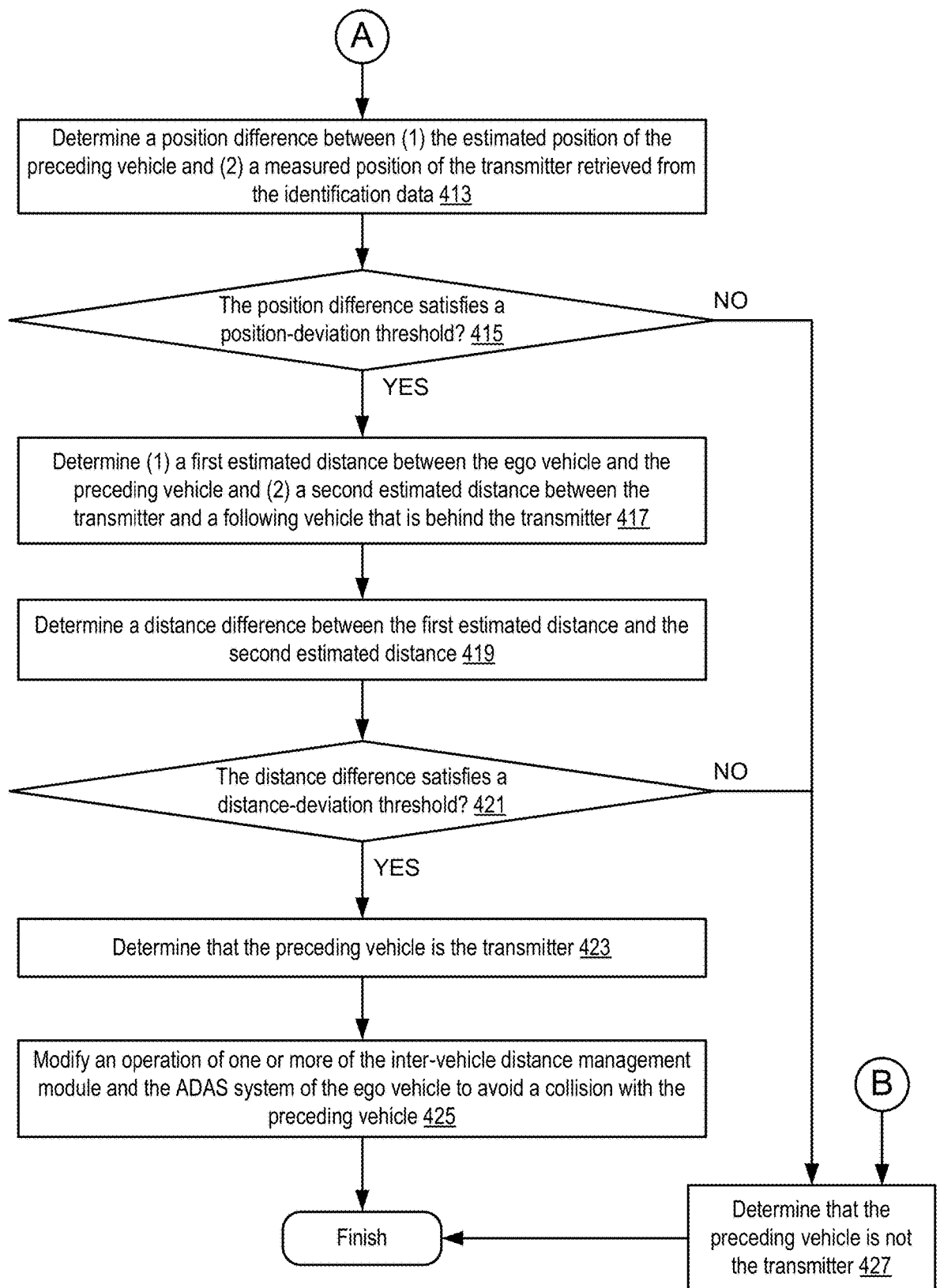

FIGS. 4A-4B depict another method 400 for identifying a transmitter of a V2X message according to some embodiments. The steps of the method 400 are executable in any order, and not necessarily the order depicted in FIGS. 4A-4B.

Referring to FIG. 4A, at step 401, the modification module 204 modifies an operation of the communication unit 145 of the ego vehicle 123 to receive a V2X message that includes identification data of a transmitter of the V2X message.

At step 403, the identification software module 195 determines whether the transmitter is in a same lane as the ego vehicle 123. Responsive to determining that the transmitter is in the same lane as the ego vehicle 123, the method 400 moves to step 405. Otherwise, the method 400 moves to step 427.

At step 405, the identification software module 195 measures a distance between the ego vehicle 123 and a preceding vehicle ahead of the ego vehicle 123.

At step 407, the identification software module 195 determines whether the distance satisfies a distance threshold. Responsive to determining that the distance does not satisfy the distance threshold, the method 400 moves to step 409. Otherwise, the method 400 moves to step 411.

At step 409, the identification software module 195 modifies an operation of the inter-vehicle distance management module 193 of the ego vehicle 123 to control the distance between the ego vehicle 123 and the preceding vehicle to satisfy the distance threshold.

At step 411, the identification software module 195 determines an estimated position of the preceding vehicle based on (1) a measured position of the ego vehicle 123 and (2) a relative position between the ego vehicle 123 and the preceding vehicle measured by one or more ranging sensors of the ego vehicle 123.

Referring to FIG. 4B, at step 413, the identification software module 195 determines a position difference between (1) the estimated position of the preceding vehicle and (2) a measured position of the transmitter retrieved from the identification data.

At step 415, the identification software module 195 determines whether the position difference satisfies a position-deviation threshold. Responsive to determining that the position difference satisfies the position-deviation threshold, the method 400 moves to step 417. Otherwise, the method 400 moves to step 427.

At step 417, the identification software module 195 determines (1) a first estimated distance between the ego vehicle 123 and the preceding vehicle and (2) a second estimated distance between the transmitter and a following vehicle that is behind the transmitter.

At step 419, the identification software module 195 determines a distance difference between the first estimated distance and the second estimated distance.

At step 421, the identification software module 195 determines whether the distance difference satisfies a distance-deviation threshold. Responsive to determining that the distance difference satisfies the distance-deviation threshold, the method 400 moves to step 423. Otherwise, the method 400 moves to step 427.

At step 423, the identification software module 195 determines that the preceding vehicle is the transmitter.

At step 425, the identification software module 195 modifies an operation of one or more of the inter-vehicle distance management module 193 and the ADAS system 183 of the ego vehicle 123 to avoid a collision with the preceding vehicle.

At step 427, the identification software module 195 determines that the preceding vehicle is not the transmitter.

Figure 5A:
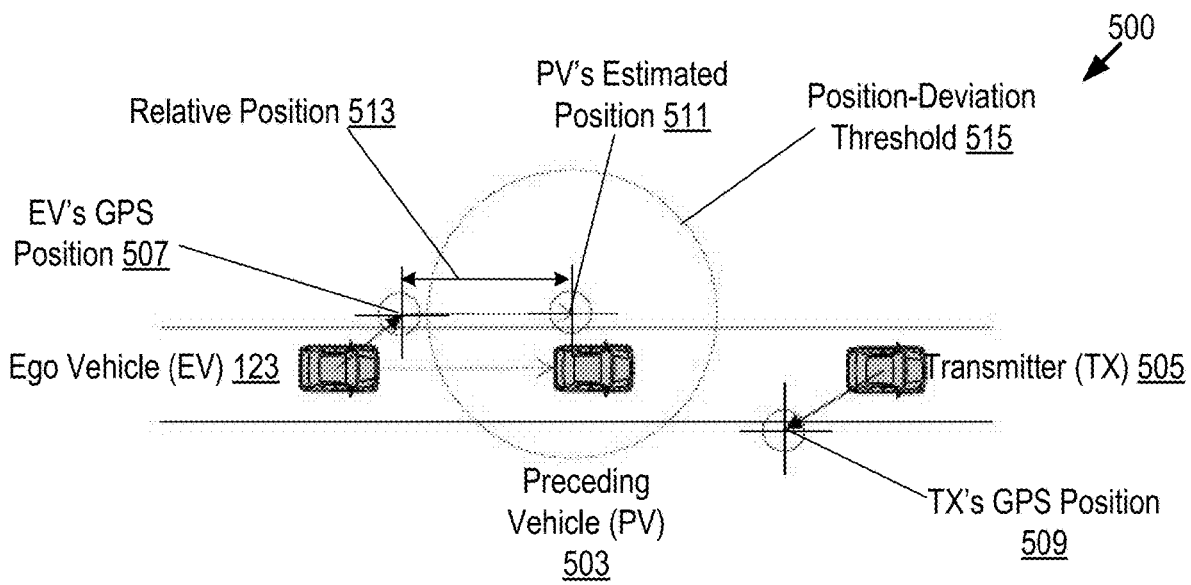
FIGS. 5A-5C are graphical representations illustrating an identification of a transmitter of a V2X message based on location data shared by the transmitter respectively according to some embodiments.

Referring to FIG. 5A, depicted is an example 500 of an identification of a transmitter of a V2X message based on location data shared by the transmitter according to some embodiments. In a roadway environment depicted in FIG. 5A, three vehicles (e.g., the ego vehicle (EV) 123, a preceding vehicle (PV) 503 and a transmitter (TX) 505) are shown on a same lane. The transmitter 505 may broadcast a V2X message including its identification data. Responsive to receiving the V2X message, the ego vehicle 123 may like to determine whether the preceding vehicle 503 ahead is a transmitter of the V2X message.

Specifically, the ego vehicle 123 determines a relative position 513 between the ego vehicle 123 and the preceding vehicle 503 based on ranging sensor data measured by one or more ranging sensors of the ego vehicle 123. The ego vehicle 123 determines an estimated position 511 of the preceding vehicle 503 based on a measured GPS position 507 of the ego vehicle 123 and the relative position 513 between the ego vehicle 123 and the preceding vehicle 503 (e.g., the estimated position 511 of the preceding vehicle=the measured GPS position 507 of the ego vehicle 123+the relative position 513 between the ego vehicle 123 and the preceding vehicle 503).

The ego vehicle 123 determines a position difference between (1) the estimated position 511 of the preceding vehicle 503 and (2) a measured GPS position 509 of the transmitter (e.g., the position difference=a distance between the estimated position 511 of the preceding vehicle 503 and the measured GPS position 509 of the transmitter 505). The ego vehicle 123 determines that the position difference does not satisfy a position-deviation threshold 515 (e.g., the position difference is greater than the position-deviation threshold 515). Then, the ego vehicle 123 may determine that the preceding vehicle 503 is not the transmitter of the V2X message. In this case, the preceding vehicle 503 is correctly identified as not being the transmitter of the V2X message.

Figure 5B:
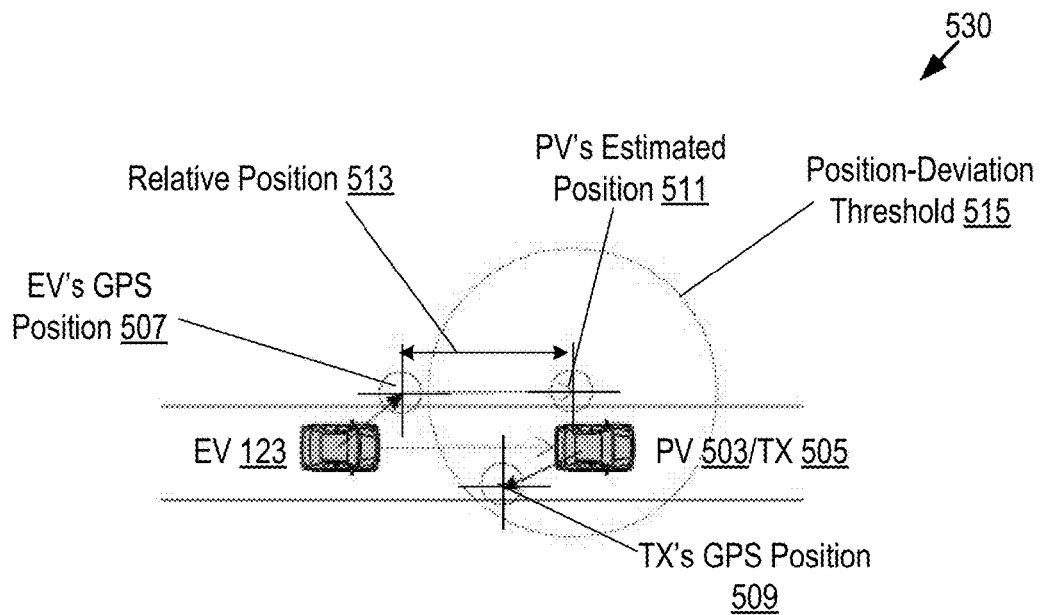

Referring to FIG. 5B, depicted is another example 530 of an identification of a transmitter of a V2X message based on location data shared by the transmitter according to some embodiments. In a roadway environment depicted in FIG. 5B, two vehicles (e.g., the ego vehicle (EV) 123, the transmitter (TX) 505) are shown on a same lane. Here, the preceding vehicle 503 of the ego vehicle 123 is the transmitter 505.

The transmitter 505 may broadcast a V2X message including its identification data. The ego vehicle 123 may perform operations similar to those described above for FIG. 5A to determine whether the position difference between (1) the estimated position 511 of the preceding vehicle 503 and (2) the measured GPS position 509 of the transmitter satisfies the position-deviation threshold 515. In this example, the ego vehicle 123 determines that the position difference satisfies the position-deviation threshold 515 (e.g., the position difference is smaller than the position-deviation threshold 515). Then, the ego vehicle 123 may determine that the preceding vehicle 503 is the transmitter 505 of the V2X message. In this case, the preceding vehicle 503 is correctly identified as being the transmitter 505 of the V2X message.

Figure 5C:
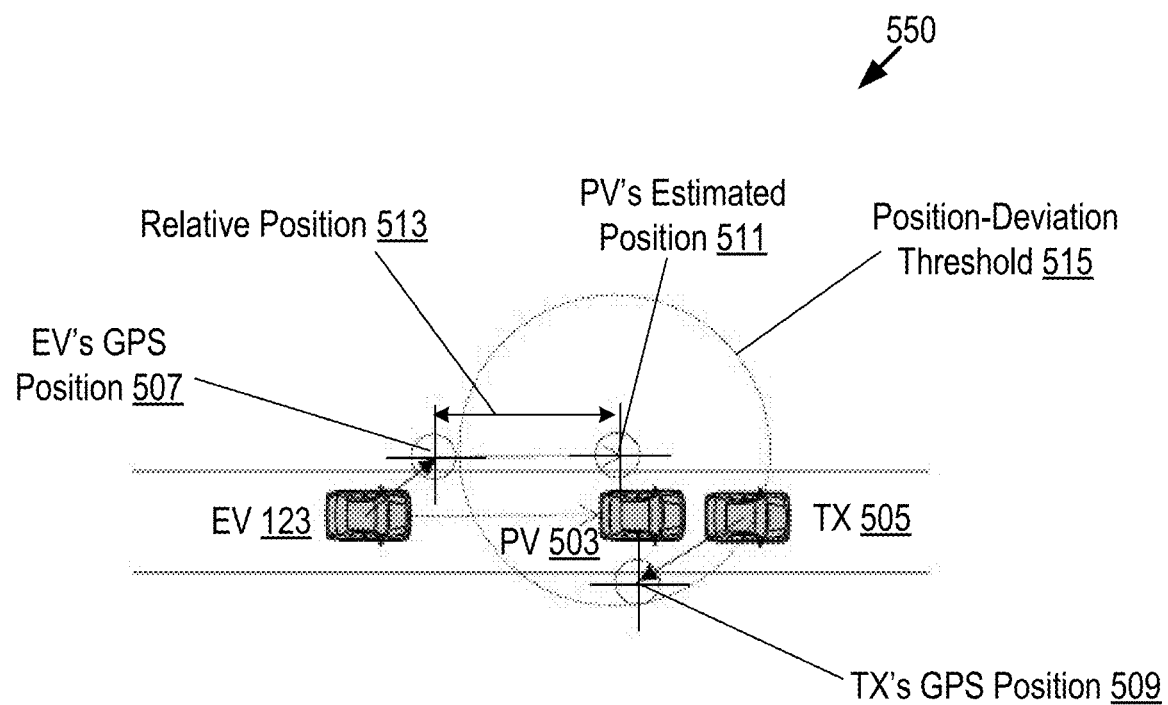

Referring to FIG. 5C, depicted is yet another example 550 of an identification of a transmitter of a V2X message based on location data shared by the transmitter according to some embodiments. In a roadway environment depicted in FIG. 5C, three vehicles (e.g., the ego vehicle (EV) 123, the preceding vehicle (PV) 503, the transmitter (TX) 505) are shown on a same lane. Here, the preceding vehicle 503 of the ego vehicle 123 is close to the transmitter 505.

The transmitter 505 may broadcast a V2X message including its identification data. The ego vehicle 123 may perform operations similar to those described above for FIG. 5A to determine whether the position difference between (1) the estimated position 511 of the preceding vehicle 503 and (2) the measured GPS position 509 of the transmitter satisfies the position-deviation threshold 515. In this example, the ego vehicle 123 determines that the position difference satisfies the position-deviation threshold 515 (e.g., the position difference is smaller than the position-deviation threshold 515). Then, the ego vehicle 123 may determine that the preceding vehicle 503 is the transmitter of the V2X message. In this case, the preceding vehicle 503 is incorrectly identified as being the transmitter of the V2X message, and a false-positive misidentification of the transmitter occurs.

However, this false-positive misidentification can be avoided if procedure (4) (e.g., the transmitter-ranging-sensor-data-based judgment) is further executed. For example, as described below with reference to FIG. 6B, by calculating a distance difference between (i) a first estimated distance between the ego vehicle 123 and the preceding vehicle 503 and (ii) a second estimated distance between the transmitter 505 and a following vehicle (here the following vehicle of the transmitter 505 being the preceding vehicle 503), and determining that the distance difference does not satisfy a distance-deviation threshold, the ego vehicle 123 can determine that the preceding vehicle 503 is not the transmitter. Further description is provided below with reference to FIG. 6B.

Referring to FIG. 6A, depicted is an example 600 of an identification of a transmitter of a V2X message based on ranging sensor data shared by the transmitter according to some embodiments. In a roadway environment depicted in FIG. 6A, two vehicles (e.g., the ego vehicle (EV) 123 and the transmitter (TX) 505) are shown on a same lane. The transmitter 505 may broadcast a V2X message including its identification data. Responsive to receiving the V2X message, the ego vehicle 123 may like to determine whether the preceding vehicle 503 ahead is a transmitter of the V2X message.

Specifically, the ego vehicle 123 determines whether there is any following vehicle behind the transmitter 505 based on the transmitter's ranging sensor data retrieved from the identification data included in the received V2X message. In this example, the ego vehicle 123 determines that a following vehicle (FV) 603 is detected by the transmitter's ranging sensors. Here, the following vehicle 603 of the transmitter 505 is the ego vehicle 123, and the preceding vehicle 503 of the transmitter 505 is the transmitter 505.

The ego vehicle 123 determines a first estimated distance d(EV,PV) between the ego vehicle 123 and the preceding vehicle 503 based on ranging sensor data of the ego vehicle 123. The ego vehicle 123 determines a second estimated distance d(TX,FV) between the transmitter 505 and the following vehicle 603 based on ranging sensor data of the transmitter 505.

The ego vehicle 123 determines a distance difference between the first estimated distance d(EV,PV) and the second estimated distance d(TX,FV), and determines whether the distance difference satisfies a distance-deviation threshold. In this example, the first estimated distance d(EV,PV) is equal to the second estimated distance d(TX,FV), and so, the distance difference is zero and satisfies the distance-deviation threshold (e.g., the distance difference between d(EV,PV) and d(TX,FV) is not greater than the distance-deviation threshold). The ego vehicle 123 may determine that the preceding vehicle 503 is the transmitter of the V2X message. In this case, the preceding vehicle 503 is correctly identified as being the transmitter of the V2X message.

Referring to FIG. 6B, depicted is another example 610 of an identification of a transmitter of a V2X message based on ranging sensor data shared by the transmitter according to some embodiments. In a roadway environment depicted in FIG. 6B, three vehicles (e.g., the ego vehicle (EV) 123, the preceding vehicle 503 (identical to the following vehicle 603) and the transmitter (TX) 505) are shown on a same lane. The transmitter 505 may broadcast a V2X message including its identification data.

The ego vehicle 123 may perform operations similar to those described above for FIG. 6A to determine whether the distance difference between the first estimated distance d(EV,PV) and the second estimated distance d(TX,FV) satisfies a distance-deviation threshold. In this example, the first estimated distance d(EV,PV) is greater than the second estimated distance d(TX,FV). The distance difference does not satisfy the distance-deviation threshold (e.g., the distance difference between d(EV,PV) and d(TX,FV) is greater than the distance deviation threshold). The ego vehicle 123 may determine that the preceding vehicle 503 is not the transmitter of the V2X message. In this case, the preceding vehicle 503 is correctly identified as not being the transmitter of the V2X message.

Figure 6C:
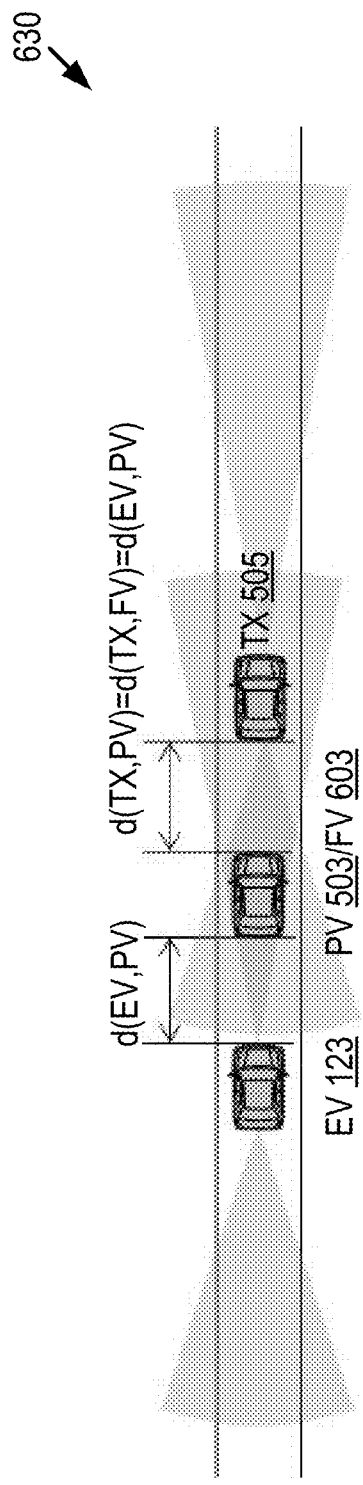

Referring to FIG. 6C, depicted is yet another example 630 of an identification of a transmitter of a V2X message based on ranging sensor data shared by the transmitter according to some embodiments. The ego vehicle 123 may perform operations similar to those described above for FIG. 6A to determine whether the distance difference between the first estimated distance d(EV,PV) and the second estimated distance d(TX,FV) satisfies a distance-deviation threshold. In this example, the first estimated distance d(EV,PV) is equal to the second estimated distance d(TX,FV), and so, the distance difference is 0 and satisfies the distance-deviation threshold (e.g., the distance difference between d(EV,PV) and d(TX,FV) is not greater than the distance deviation threshold). The ego vehicle 123 may determine that the preceding vehicle 503 is the transmitter of the V2X message. In this case, the preceding vehicle 503 is incorrectly identified as being the transmitter of the V2X message, and a false-positive misidentification of the transmitter occurs.

However, this false-positive misidentification can be avoided if procedure (2) (e.g., the proactive vehicle control) is further executed to modify the distance d(EV,PV) between the ego vehicle 123 and the preceding vehicle 503 so that the distance d(EV,PV) satisfies a distance threshold. In this way, the identification of the transmitter in a scenario of FIG. 6C is transformed into a scenario of FIG. 6B so that the transmitter is not misidentified. Further description is provided below with reference to FIG. 7.

Figure 7:
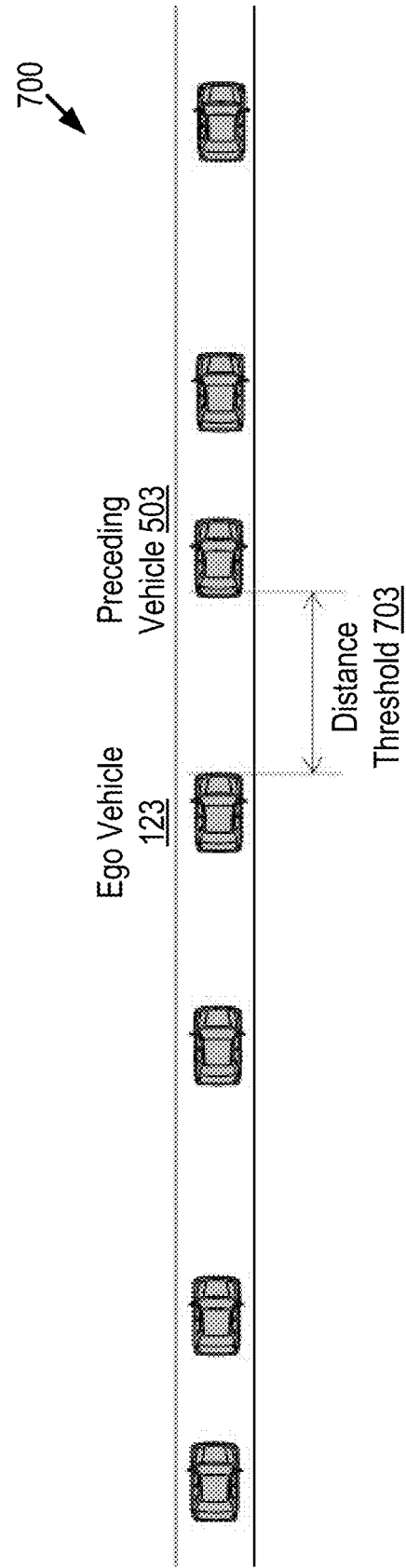
FIG. 7 is a graphical representation illustrating a proactive vehicle control that achieves a reliable and accurate identification of a transmitter of a V2X message according to some embodiments.

FIG. 7 is a graphical representation 700 illustrating the proactive vehicle control that achieves a reliable and accurate identification of a transmitter of a V2X message according to some embodiments. Multiple vehicles including the ego vehicle 123 and the preceding vehicle 503 are shown in a same lane of a road. When determining whether the preceding vehicle 503 is the transmitter, the ego vehicle 123 may keep its distance to the preceding vehicle 503 to be equal to or greater than a distance threshold 703 to reduce an occurrence of a transmitter misidentification so that the preceding vehicle 503 is reliably determined to be the transmitter or not.

For example, a satisfaction of the distance threshold 703 by the distance between the ego vehicle 123 and the preceding vehicle 503 reduces an occurrence of one or more of the following: a false-positive identification where the preceding vehicle 503 is incorrectly identified as the transmitter but the preceding vehicle 503 is actually not the transmitter; and a false-negative identification where the preceding vehicle 503 is incorrectly identified as not being the transmitter but the preceding vehicle is actually the transmitter.

An analysis that proves effectiveness of the proactive message transmitter identification system (including the identification system 199 and the identification client 197) described herein is provided here with reference to FIGS. 8A-10C. An identification of a transmitter of a V2X message can be regarded as a comparison between a set of information of the transmitter (e.g., referred to as a set of transmitter (TX) information) and a set of information of the preceding vehicle (e.g., referred to as a set of preceding-vehicle (PV) information). If these two sets of information match, the transmitter may be identified as the preceding vehicle.

Technically, any information of the transmitter which can be measured by the transmitter itself and sent through a V2X communication can be used as an element in the set of TX information, and any information of the preceding vehicle which can be measured by the ego vehicle's onboard sensors can be used as an element in the set of PV information. The set of TX information and the set of PV information may have identical items so that the set of TX information can be compared to the set of PV information. Values for the items in the set of TX information and values for the items in the set of PV information may or may not be identical to one another depending on whether the transmitter is the preceding vehicle or not and whether there are measurement errors. However, in order to correctly identify whether the transmitter is the preceding vehicle or not, it is required that values in the set of TX information is different from values in the set of PV information when the transmitter is not the preceding vehicle (e.g., referred to as a target requirement). In other words, if it is possible to find a situation in which values in the set of PV information is the same as those in the set of TX information even when the transmitter is not the preceding vehicle, it is obvious that a misidentification occurs when using these sets of information to identify the transmitter. An example challenge here is to find a set of information which satisfies the target requirement described above (e.g., finding items in the set of TX information and the set of PV information so that values in the set of TX information are different from values in the set of PV information when the transmitter is not the preceding vehicle).

A position of a vehicle measured by a GPS device can be a candidate item in the set of information. Although it is not possible to access a GPS position of the preceding vehicle directly, it can be calculated from a GPS position of the ego vehicle and a relative position between the ego vehicle and the preceding vehicle measured by ranging sensors of the ego vehicle. However, it is noted that the above target requirement cannot be satisfied if only a GPS position is used as a single item in the set of information because of a measurement error of the GPS position. Under some circumstances, this measurement error reaches 10 meters or more. This means that the measured GPS position of the transmitter can be the same as the GPS position of the preceding vehicle if the distance between the transmitter and the preceding vehicle is shorter than the GPS measurement error.

Figure 8A:
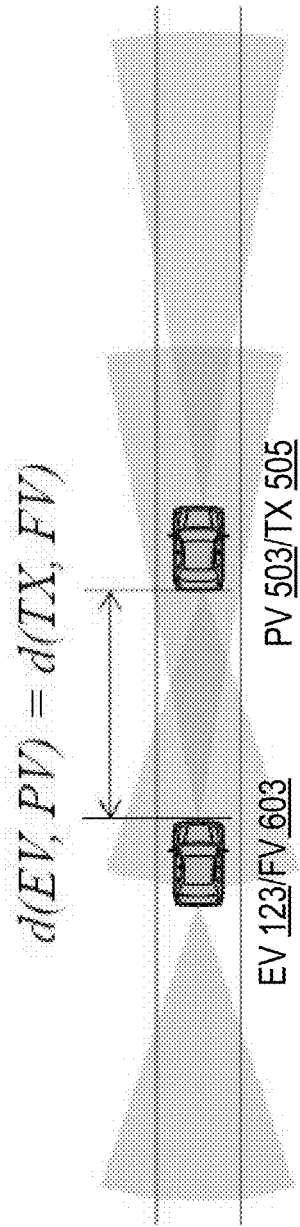
FIGS. 8A-8B are graphical representations illustrating basic conditions against ranging sensor data according to some embodiments.
Figure 8B:
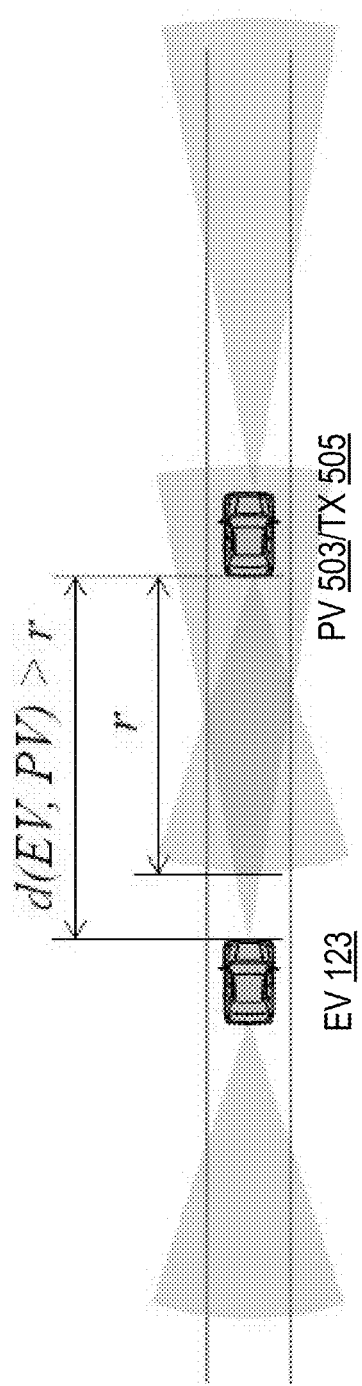

Ranging sensor data can also be a candidate item in the set of information. Consider a scenario with a single lane and with V2V messages including distances to detected objects and sensor ranges. As depicted in FIG. 8A, if the transmitter 505 is the preceding vehicle 503 and the ego vehicle 123 is within a sensor range of the transmitter 505, a distance d(EV,PV) from the ego vehicle 123 to the preceding vehicle 503 is the same as a distance d(TX,FV) from the transmitter 505 to the following vehicle 603 (the following vehicle 603 is actually the ego vehicle 123 in this case). In other words, if d(EV,PV) and d(TX,FV) are different, the transmitter 505 may not be the preceding vehicle 503. Similarly, if the transmitter 505 reports that it detects a following vehicle behind although it is known that the ego vehicle 123 is outside of a ranging sensor range "r" of the transmitter 505, the transmitter 505 may be the preceding vehicle 503 as depicted in FIG. 8B. However, it can happen that these conditions are satisfied (e.g., d(EV,PV)=d(TX,FV) or d(EV,PV)>r) but the transmitter 505 is not the preceding vehicle 503 when the transmitter 505 and an irrelevant vehicle are accidentally making the same positional relation as the ego vehicle 123 and the preceding vehicle 503 which are in different locations.

Here, FIGS. 8A-8B depicts basic conditions against ranging sensor data according to some embodiments.

To make a set of information which satisfies the above target requirement, both the GPS position and ranging sensor data can be used together. The following description focuses on a minimal distance between the preceding vehicle and the transmitter when the basic conditions against ranging sensor data are satisfied. At the first, it should be noted that the distance between the preceding vehicle and the transmitter is obviously zero when the transmitter is the preceding vehicle. Consider a scenario with a single lane again. Situations where the transmitter is not the preceding vehicle can be divided into two categories: (1) first situations where the transmitter travels behind the ego vehicle; and (2) second situations where the transmitter travels ahead of the preceding vehicle.

Figure 9A:
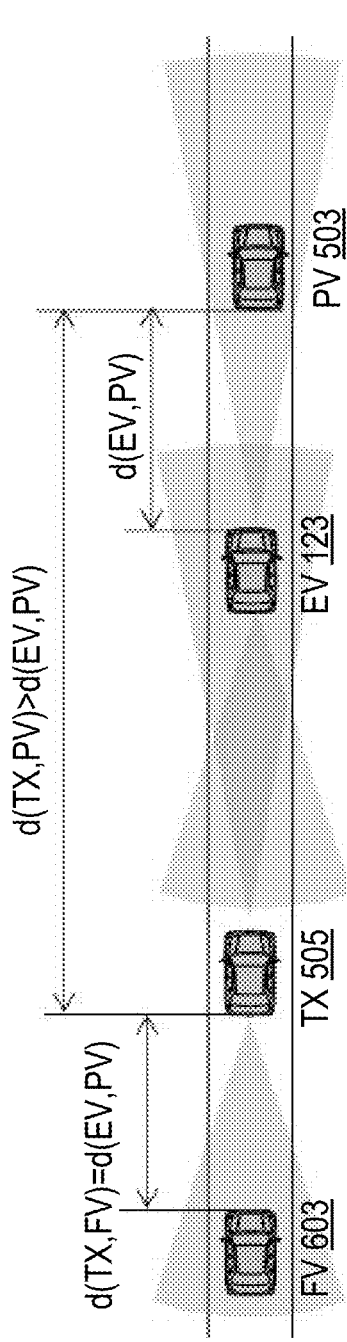
FIGS. 9A-9B are graphical representations illustrating a distance between a transmitter of a V2X message and a preceding vehicle respectively when the transmitter is behind an ego vehicle according to some embodiments.
Figure 9B:
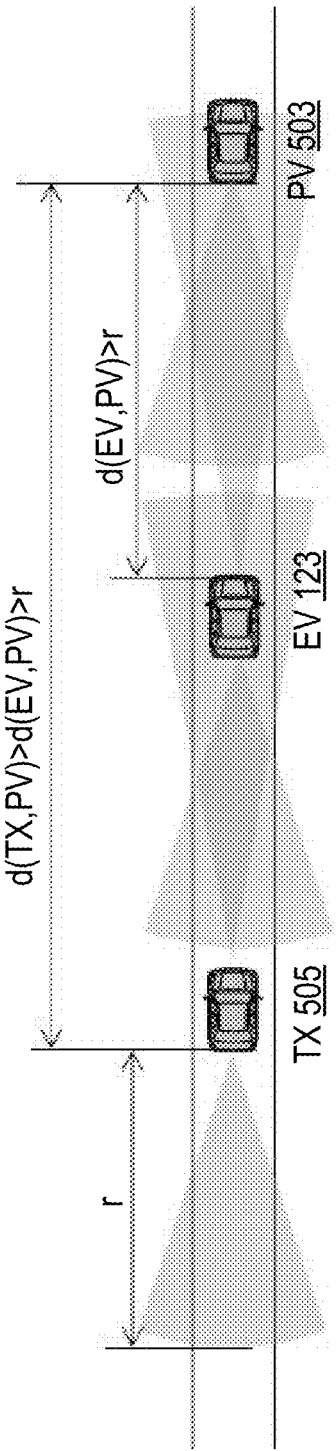

In the first situations, as depicted in FIGS. 9A-9B, if the transmitter 505 travels behind the ego vehicle 123, it is obvious that d(TX,PV) is greater than d(EV,PV). In addition, as depicted in FIG. 9B, when the transmitter 505 doesn't detect any vehicle behind, d(EV,PV) needs to be greater than the ranging sensor range "r" in order to satisfy the basic conditions against ranging sensor data (e.g., a basic condition shown in FIG. 8B with d(EV,PV)>r). Here, FIGS. 9A-9B illustrates the distance d(TX,PV) between the transmitter 505 and the preceding vehicle 503 respectively when the transmitter 505 is behind the ego vehicle 123.

The second situations are divided into two subcategories additionally: (1) first sub-situations where the transmitter detects a following vehicle behind; and (2) second sub-situations where the transmitter detects no vehicles behind.

With respect to the first sub-situations of the second situations, when the basic conditions against ranging sensor data are satisfied, d(TX,FV) is the same as d(EV,PV) (otherwise the transmitter is always correctly identified as not being the preceding vehicle). It means that d(TX,PV) may be greater than d(EV,PV) as depicted in FIG. 10A. In FIG. 10A, there are other vehicles between the transmitter 505 and the preceding vehicle 503. When the following vehicle 603 behind the transmitter 505 is the preceding vehicle 503 (as depicted in FIG. 10B), the distance d(TX,PV) is shorter than other cases that there are other vehicles between the transmitter and the preceding vehicle. The distance d(TX,FV) is equal to d(EV,PV) as depicted in FIG. 10B.

Figure 10C:
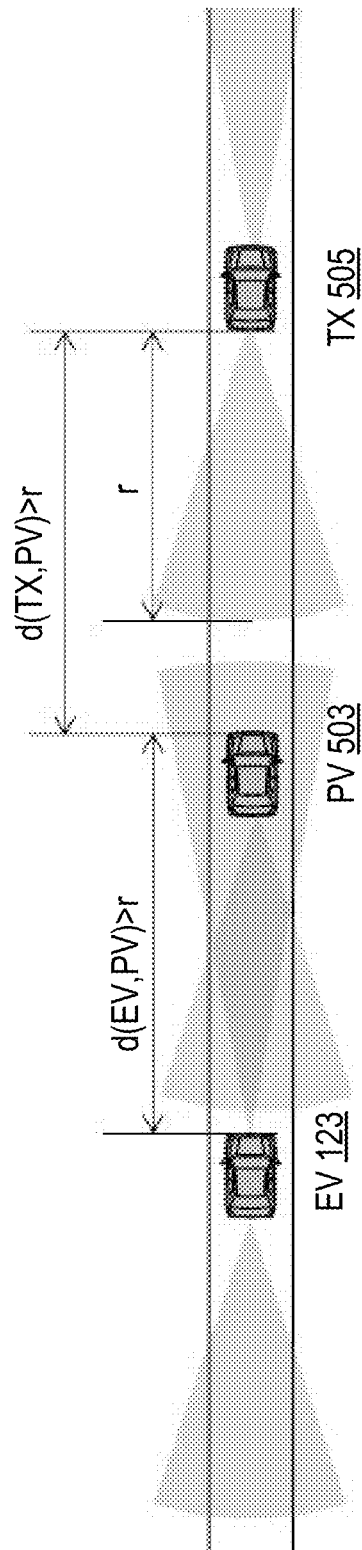

With respect to the second sub-situations of the second situations, it is obvious that the distance between the transmitter 505 and the preceding vehicle 503 is greater than the ranging sensor range "r" of the transmitter 505 as depicted in FIG. 10C.

Here, FIGS. 10A-10C illustrates the distance d(TX,PV) between the transmitter 505 and the preceding vehicle 503 respectively when the transmitter 505 is ahead of the preceding vehicle 503.

From the discussion above, two findings can be obtained, including: (I) when the transmitter is not the preceding vehicle but the basic conditions against ranging sensor data are satisfied and the transmitter detects no vehicles behind, d(TX,PV) is greater than the ranging sensor range r (e.g., d(TX,PV)>r); (II) when the transmitter is not the preceding vehicle but the basic conditions against ranging sensor data are satisfied and the transmitter detects a vehicle behind, d(TX,PV) is greater than d(EV,PV) (e.g., d(TX,PV)>d(EV,PV)).

It is noted that d(EV,PV) is usually manageable by the ego vehicle itself and directly measured by the ego vehicle's ranging sensors. Also, the ranging sensor range r can be regarded as a constant value. To measure d(TX,PV), GPS positions can be used under circumstances described below although they have measurement errors as mentioned.

As mentioned above, it is not possible to access the GPS position of the preceding vehicle directly, but it can be calculated from the GPS position of the ego vehicle and the relative position measured by ranging sensors of the ego vehicle. Then, since the measurement error of the ranging sensors is much smaller than the measurement error of GPS positioning (generally the measurement error of the ranging sensors is in a centimeter order or less), the measured distance (e.g., d'(TX,PV)) between the transmitter and the preceding vehicle can be expressed as:

$0 \leq d'(TX,PV) \leq 2E_{gps}$ (when the transmitter is the preceding vehicle), $d(TX,PV) - 2E_{gps} \leq d'(TX,PV) \leq d(TX,PV) + 2E_{gps}$ (when the transmitter is not the preceding vehicle), where $E_{gps}$ represents an upper limit of the measurement error of the GPS positioning, and d(TX,PV) represents an actual distance between the transmitter and the preceding vehicle. Thus, it is possible to find a threshold which can correctly separate cases that the transmitter is the preceding vehicle from other cases that the transmitter is not the preceding vehicle if it is guaranteed that d(TX,PV) is greater than $4E_{gps}$ when the transmitter is not the preceding vehicle. According to the findings (I) and (II) described above, d(TX,PV) is greater than the ranging sensor range r or d(EV,PV), and so, it is possible to find the threshold if the ranging sensor range r and d(EV,PV) are greater than $4E_{gps}$ (which means that d(TX,PV) is also greater than $4E_{gps}$).

The discussion above focuses on a 1-lane road. However, it is easily applicable to general multi-lane roads if vehicles have an ability to detect their respective driving lanes and share this information with other vehicles through V2X communications (e.g., V2V communications). Accordingly, embodiments described herein are also applicable in a roadway environment with multi-lane roads.

Figure 11:
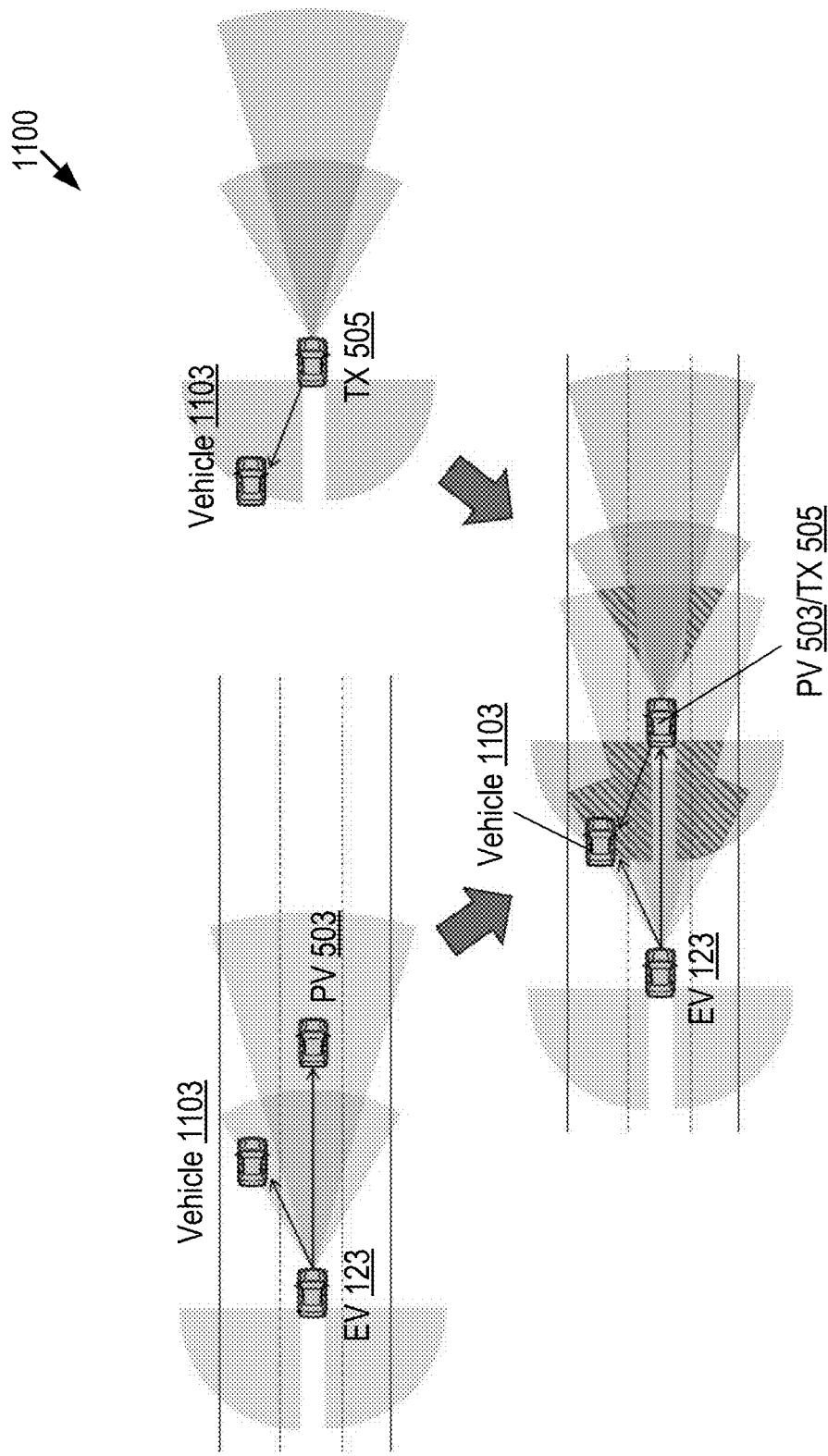
FIG. 11 is a graphical representation illustrating an identification of a transmitter of a V2X message in a scenario of multiple lanes according to some embodiments.

FIG. 11 is a graphical representation 1100 illustrating an information-matching approach to identify a transmitter of a V2X message in a scenario of multiple lanes according to some embodiments. In this approach, no GPS data is used. For example, the ego vehicle 123 detects the preceding vehicle 503 ahead on a same lane and detects a vehicle 1103 ahead on a left lane, while the transmitter 505 detects the vehicle 1103 behind on the left lane. By matching the roadway information detected by the ego vehicle 123 and the roadway information detected by the transmitter 505, it can be determined that the transmitter 505 is the preceding vehicle 503.

Figure 12A:
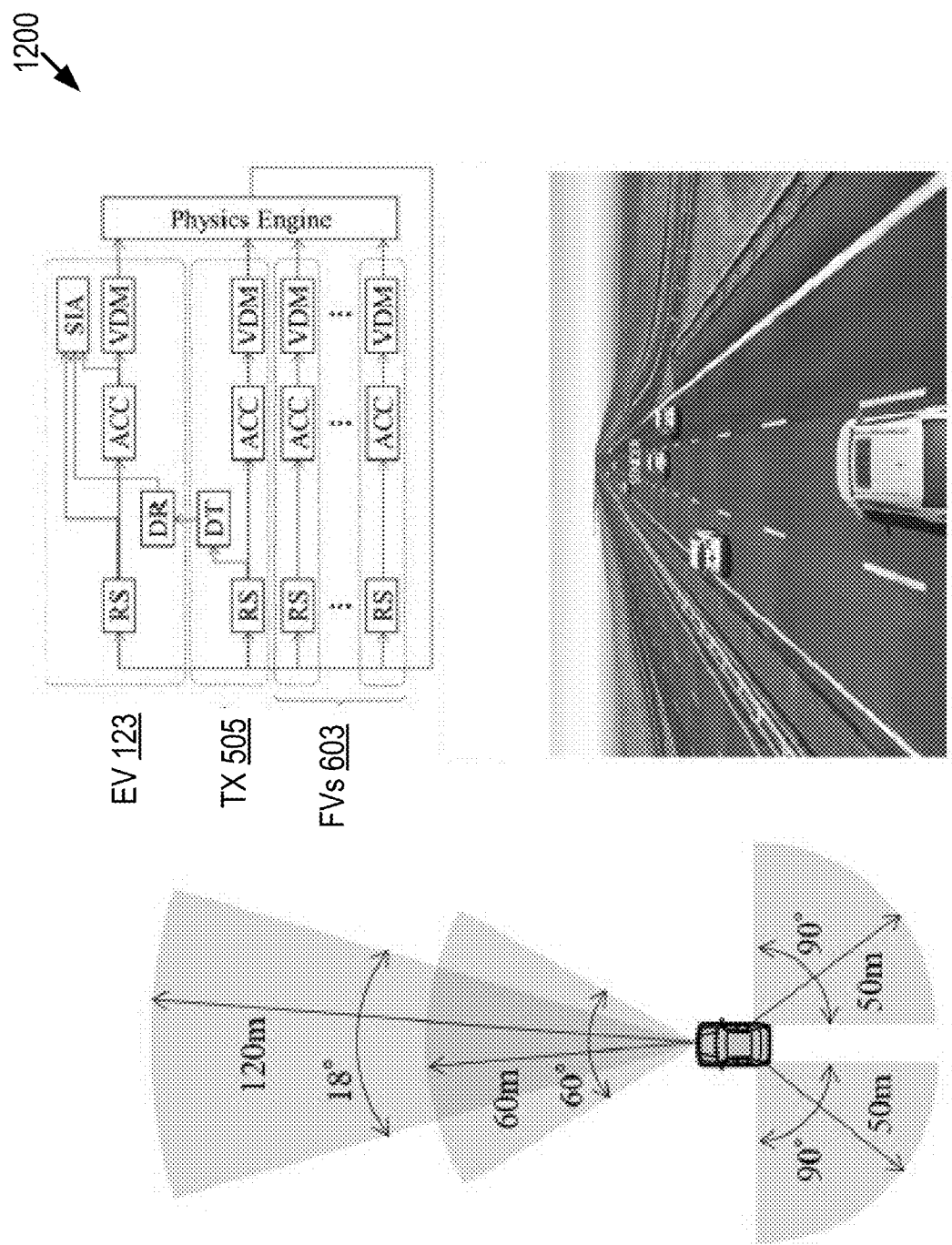
FIGS. 12A-12B are graphical representations illustrating a simulation of an identification of a transmitter in a scenario of multiple lanes according to some embodiments.
Figure 12B:
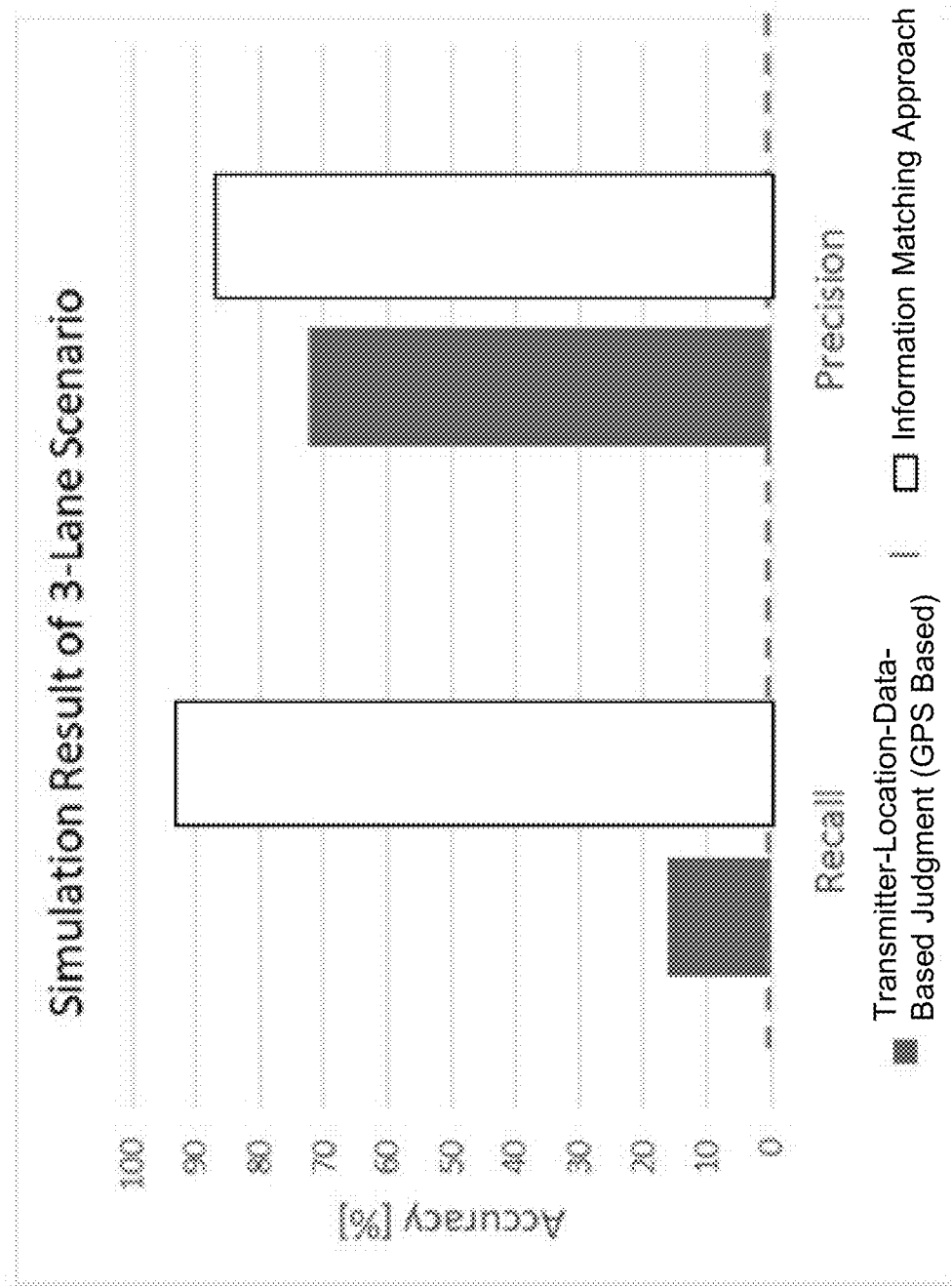

FIGS. 12A-12B are graphical representations 1200 and 1230 illustrating a simulation of an identification of a transmitter in a scenario of multiple lanes according to some embodiments. FIG. 12A illustrates (1) ranging sensor ranges of a vehicle with respect to different directions and angles on the left of the figure, (2) a block diagram of a simulation model on the upper right corner of the figure and (3) a graphical representation of a simulated roadway environment on the lower right corner of the figure. In the simulation model on the upper right corner of the figure, RS represents ranging sensors, ACC represents an adaptive cruise control, VDM represents a vehicle dynamics model, SIA represents a sender identification algorithm, DR represents a data receiver, and DT represents a data transmitter.

The simulation is run using the information-matching approach shown in FIG. 11, with a random test in Unity3D. A simulated scenario includes: (1) 11 vehicles travels in a 3-lane straight road with randomized parameters; (2) all vehicles have ranging sensors and adaptive cruise control functionality; (3) one of the vehicles is a transmitter of a V2X message; and (4) the ego vehicle tries to determine if its preceding vehicle is the transmitter or not in every frame of 20 milliseconds (ms). The randomized parameters include: (1) for each lane, a lateral distance from a lane center being ±0.5 m; (2) a vehicle velocity between 80 km/h and 120 km/h; (3) an inter-vehicle distance of 0.5 seconds to 3.0 seconds; and (4) a longitudinal distance from the ego vehicle to the preceding vehicle between 50 m and 150 m.

In some embodiments, a simulation result is evaluated by the following example analysis: conducting 2400 times of 30-second simulations; counting the number of true positive (TP), true negative (TN), false positive (FP) and false negative (FN); and calculating a recall, a precision, and an overall accuracy. The recall indicates how complete a detection is. For example, the recall is determined by the following example analysis: recall=(the number of true positive)/(the number of true positive+the number of true negative). The precision indicates how useful the detection is. For example, the precision=(the number of true positive)/(the number of true positive+the number of false positive).

The simulation result shown in FIG. 12B includes a first result when procedure (3) (e.g., the transmitter-location-data-based judgment) described above is applied and a second result when the information matching approach of FIG. 11 is applied with no use of GPS data. When executing procedure (3) (e.g., the transmitter-location-data-based judgment), the following parameters are configured: GPS noise with a variance of σ=10 m and a mean of μ=0; a filter factor of 0.9; and a position-deviation threshold of 4 m.

Figure 12C:
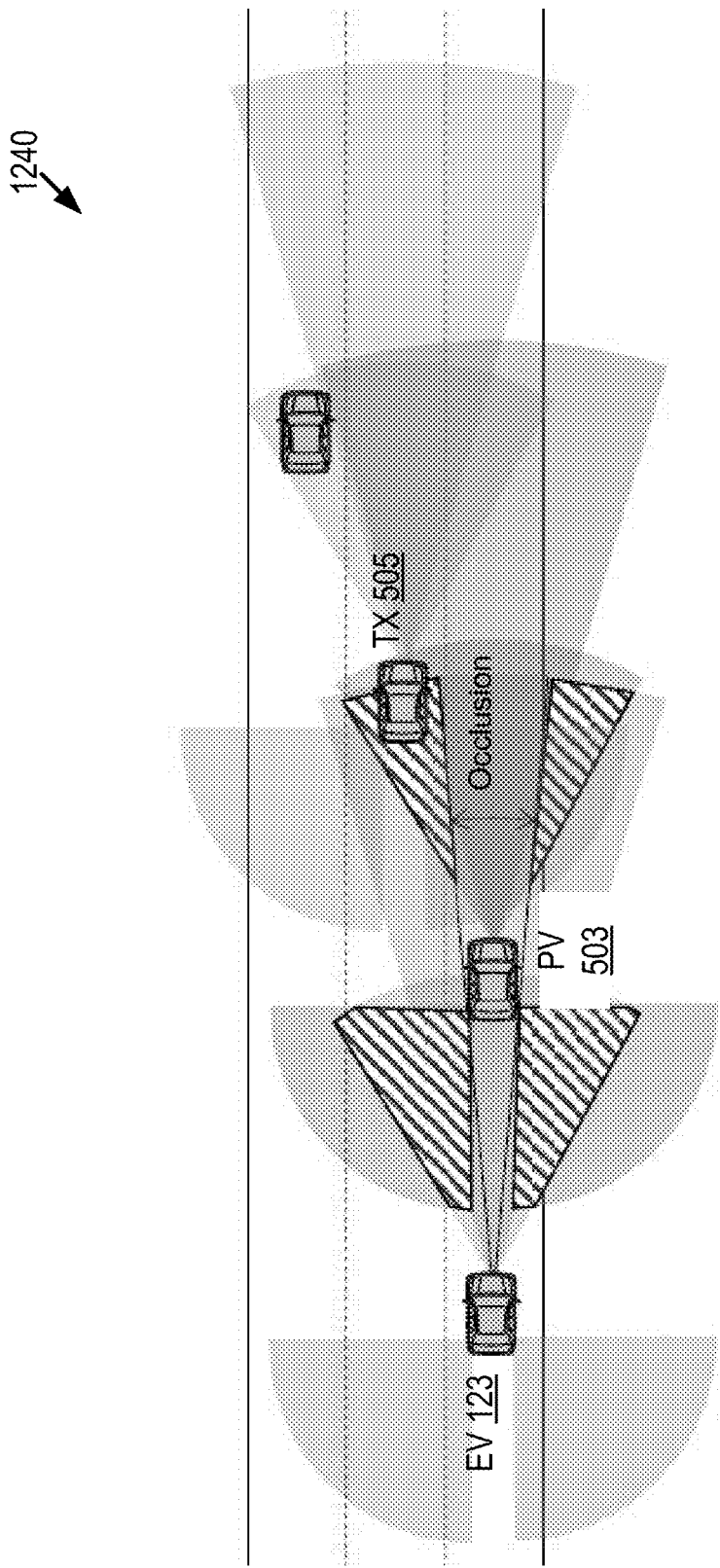
FIG. 12C is a graphical representation illustrating a misidentification of a transmitter in a scenario of multiple lanes according to some embodiments.

FIG. 12C is a graphical representation 1240 illustrating a misidentification of a transmitter in a scenario of multiple lanes according to some embodiments. In FIG. 12C, the preceding vehicle 503 detects a vehicle ahead on its left lane, and the transmitter 505 also detects a vehicle ahead on its left lane. The detected information of the preceding vehicle 503 matches the detected information of the transmitter 505. Thus, according to the information-matching approach described above, the preceding vehicle 503 can be incorrectly identified as the transmitter 505. If so, a misidentification occurs. To prevent this misidentification, procedures (1)-(5) described above can be applied to determine whether the preceding vehicle 503 is the transmitter 505.

Figure 13A:
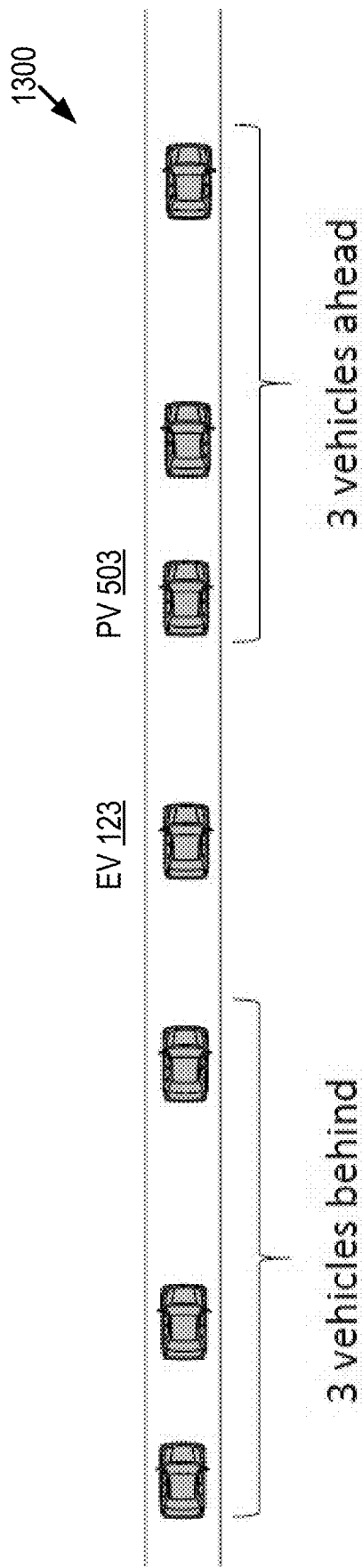
FIGS. 13A-13C are graphical representations illustrating a simulation of an identification of a transmitter in a scenario of a one-lane road according to some embodiments.
Figure 13B:
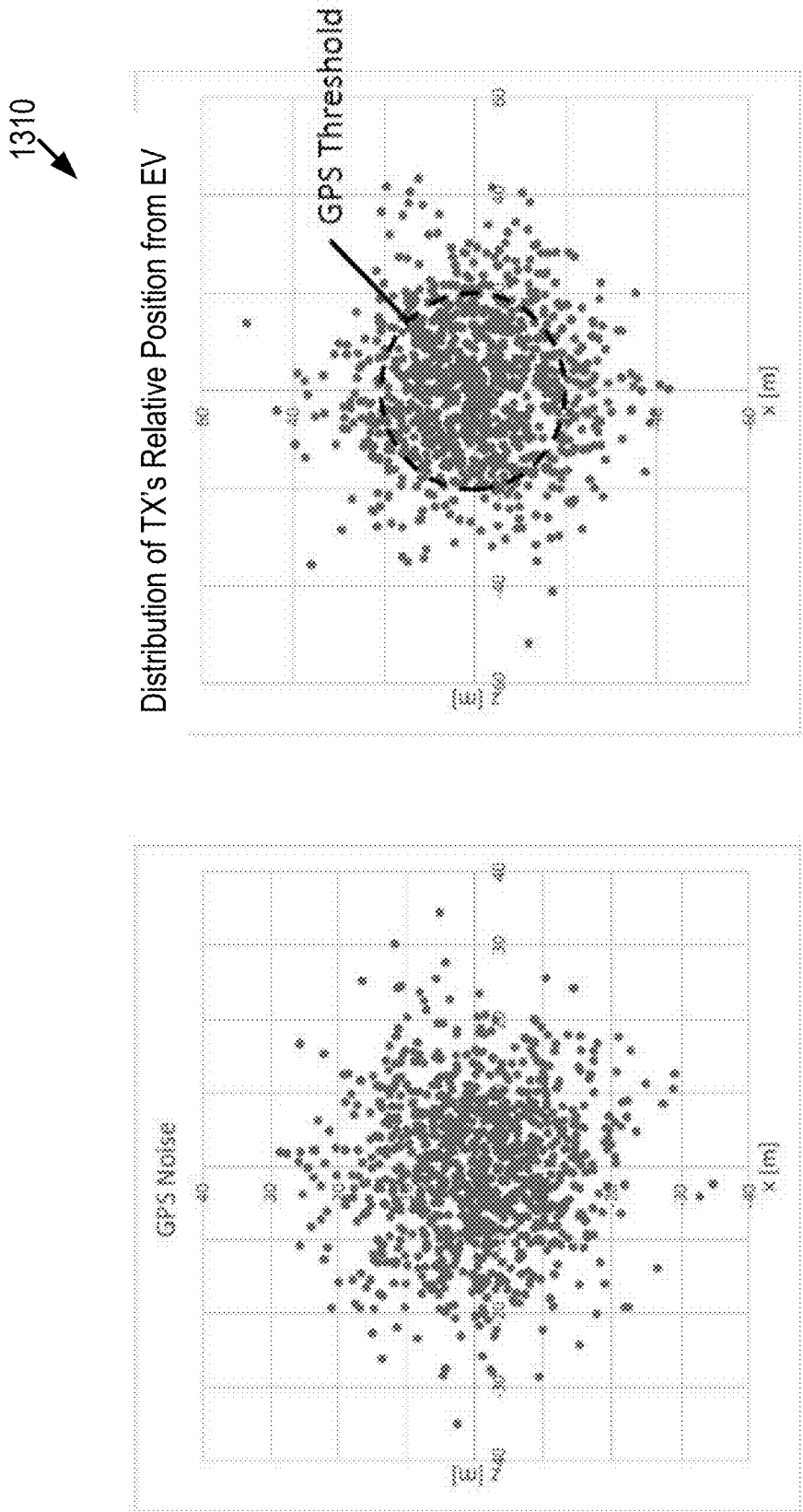
Figure 13C:
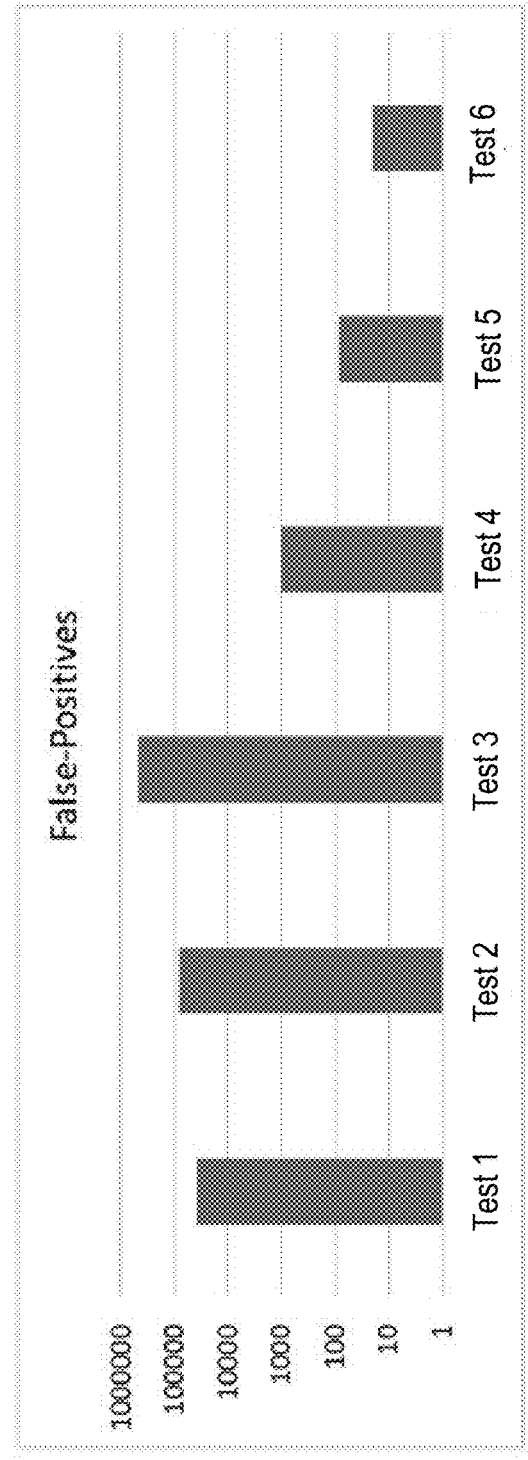

FIGS. 13A-13C are graphical representations 1300, 1310 and 1330 illustrating a simulation of an identification of a transmitter in a scenario of a single lane according to some embodiments. In a 1-lane road, when a preceding vehicle is not a transmitter but misidentified as the transmitter, a distance d(TX,PV) between the actual transmitter and the preceding vehicle is greater than a distance d(EV,PV) between the ego vehicle and the preceding vehicle when the transmitter detects a vehicle behind (e.g., d(TX,PV)>d(EV, PV)) or greater than a ranging sensor range r of the transmitter when the transmitter does not detect any vehicle behind (e.g., d(TX,PV)>r) (see, e.g., the findings (I) and (II) described above with references to FIGS. 8A-10C). The distance d(EV,PV) between the ego vehicle and the preceding vehicle is manageable by the ego vehicle while the ranging sensor range r has a constant value. The distance d(TX,PV) between the transmitter and the preceding vehicle can be kept to be a certain value by keeping the distance d(EV,PV) between the ego vehicle and the preceding vehicle to have at least the certain value so that GPS data can also be integrated into a determination of whether the preceding vehicle is the transmitter.

A scenario in the simulation includes: (1) 7 vehicles travel in a 1-lane straight road with randomized headways between 10 m and 100 m (as shown in FIG. 13A); (2) the 4th vehicle is the ego vehicle 123 which tries to determine whether the preceding vehicle 503 is the transmitter; (3) one of the vehicles except the 4th vehicle is the transmitter; and (4) the vehicles have a front radar of 120 m and a rear radar of 60 m. The simulation is evaluated by the following example analysis: running 10,000 headway patterns and 261 GPS-noise tests, leading to 2,610,000 decisions (e.g., 10,000 headway patterns×261 GPS noise=2,610,000 decisions); and counting the number of false positive (FP) and the number of false negative (FN).

FIG. 13B depicts a distribution of GPS noise in the simulation and a distribution of the transmitter's relative position from the ego vehicle. The GPS noise has a standard distribution, with a variance of σ=10 m and a mean of μ=0. No filter is applied in this simulation.

FIG. 13C depicts a simulation result. Different combinations of procedures (1)-(5) described above can be applied in the simulation as different tests. In all the tests, since a 1-lane road is considered here, procedure (1) (e.g., the transmitter-lane-data-based judgment) is considered to be already executed to determine that the ego vehicle is in the same lane as the transmitter. In FIG. 13C, 6 different combinations of procedure (2) (e.g., the proactive vehicle control), procedure (3) (e.g., the transmitter-location-data-based judgment), procedure (4) (e.g., the transmitter-ranging-sensor-data-based judgment) and procedure (5) (e.g., the biased sensitivity evaluation) are simulated as 6 different tests.

Here, the distance threshold in procedure (2) is configured to be 40 m, the position-deviation threshold in procedure (3) is configured to be 20 m and the difference-deviation threshold in procedure (4) is configured to be 1 m.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for an ego vehicle, comprising:
receiving, by a communication unit of the ego vehicle, a Vehicle-to-Everything (V2X) message that includes identification data of a transmitter of the V2X message wherein the identification data includes lane data describing a lane of travel for the transmitter;
measuring a distance between the ego vehicle and a preceding vehicle ahead of the ego vehicle;
responsive to determining that the distance between the ego vehicle and the preceding vehicle is smaller than a minimum distance threshold, modifying the distance between the ego vehicle and the preceding vehicle to satisfy the minimum distance threshold so that the distance is a modified distance that is configured to reduce an occurrence of a misidentification of the preceding vehicle as the transmitter of the V2X message; and
determining that the preceding vehicle is the transmitter based on the lane data and a determination that a position difference between an estimated position of the preceding vehicle ahead of the ego vehicle and a measured position of the transmitter satisfies a position-deviation threshold, wherein the position-deviation threshold is based on a measurement error by a sensor and the measured position of the preceding vehicle is determined based on global positioning system data having any characteristics so that application of a global positioning system noise filter to the global positioning system data is not needed to determine that the preceding vehicle is the transmitter of the V2X message.

2. The method of claim 1, wherein the position-deviation threshold is calculated from two global positioning system location data errors and one ranging-sensor measurement error.

3. The method of claim 1, wherein the satisfaction of the minimum distance threshold by the distance reduces an occurrence of a transmitter misidentification so that the preceding vehicle is reliably determined to be the transmitter and the transmitter misidentification includes one or more of the following: a false-positive identification where the preceding vehicle is incorrectly identified as the transmitter but the preceding vehicle is actually not the transmitter; or a false-negative identification where the preceding vehicle is incorrectly identified as not being the transmitter but the preceding vehicle is actually the transmitter.

4. The method of claim 1, further comprising:
responsive to determining that the preceding vehicle is the transmitter, modifying an operation of one or more of an inter-vehicle distance management module and an Advanced Driver Assistance System (ADAS system) of the ego vehicle to avoid a collision with the preceding vehicle.

5. The method of claim 4, wherein the inter-vehicle distance management module of the ego vehicle includes an adaptive cruise control system of the ego vehicle.

6. The method of claim 1, wherein determining that the preceding vehicle is the transmitter is further based on determining that there is no following vehicle behind the transmitter.

7. The method of claim 1, wherein determining that the preceding vehicle is the transmitter further comprises:
responsive to determining that the position difference satisfies the position-deviation threshold, determining a first estimated distance between the ego vehicle and the preceding vehicle and a second estimated distance between the transmitter and a following vehicle that is behind the transmitter;
determining whether a distance difference between the first estimated distance and the second estimated distance satisfies a distance-deviation threshold; and
responsive to determining that the distance difference satisfies the distance-deviation threshold, determining that the preceding vehicle is the transmitter.

8. The method of claim 7, wherein:
the estimated position of the preceding vehicle is determined based on a measured position of the ego vehicle and a relative position between the ego vehicle and the preceding vehicle measured by one or more ranging sensors of the ego vehicle;
the first estimated distance between the ego vehicle and the preceding vehicle is a relative distance between the ego vehicle and the preceding vehicle measured by the one or more ranging sensors of the ego vehicle; and
the second estimated distance between the transmitter and the following vehicle is a relative distance between the transmitter and the following vehicle that is measured by one or more ranging sensors of the transmitter and retrieved from the identification data.

9. The method of claim 1, further comprising:
determining whether the transmitter is in a same lane as the ego vehicle based on the identification data,
wherein measuring the distance between the ego vehicle and the preceding vehicle ahead of the ego vehicle occurs responsive to determining that the transmitter is in the same lane as the ego vehicle.

10. The method of claim 1, wherein determining whether the preceding vehicle is the transmitter comprises:
applying a biased sensitivity evaluation on the preceding vehicle to determine whether the preceding vehicle is the transmitter.

11. The method of claim 10, wherein applying the biased sensitivity evaluation on the preceding vehicle to determine that the preceding vehicle is the transmitter comprises:
responsive to determining that the preceding vehicle is previously determined as not being the transmitter continuously at least for a number of times, determining that the preceding vehicle is the transmitter.

12. The method of claim 1, wherein the identification data includes one or more of the following: location data of the transmitter; ranging sensor data recorded by the transmitter; or lane data describing a lane where the transmitter is located.

13. A system comprising:
an onboard vehicle computer system of an ego vehicle including a non-transitory memory storing computer code which, when executed by the onboard vehicle computer system, causes the onboard vehicle computer system to:
receive, by a communication unit of the ego vehicle, a Vehicle-to-Everything (V2X) message that includes identification data of a transmitter of the V2X message wherein the identification data includes lane data describing a lane of travel for the transmitter;

measure a distance between the ego vehicle and a preceding vehicle ahead of the ego vehicle;

responsive to determining that the distance between the ego vehicle and the preceding vehicle is smaller than a minimum distance threshold, modify the distance between the ego vehicle and the preceding vehicle to satisfy the minimum distance threshold so that the distance is a modified distance that is configured to reduce an occurrence of a misidentification of the preceding vehicle as the transmitter of the V2X message; and determine that the preceding vehicle is the transmitter based on the lane data and a determination that a position difference between an estimated position of the preceding vehicle ahead of the ego vehicle and a measured position of the transmitter satisfies a position-deviation threshold, wherein the position-deviation threshold is based on a measurement error by a sensor and the measured position of the preceding vehicle is determined based on global positioning system data having any characteristics so that application of a global positioning system noise filter to the global positioning system data is not needed to determine that the preceding vehicle is the transmitter of the V2X message.

14. The system of claim 13, wherein the position-deviation threshold is calculated from two global positioning system location data errors and one ranging-sensor measurement error.

15. The system of claim 13, wherein the satisfaction of the minimum distance threshold by the distance reduces an occurrence of a transmitter misidentification so that the preceding vehicle is reliably determined to be the transmitter and the transmitter misidentification includes one or more of the following: a false-positive identification where the preceding vehicle is incorrectly identified as the transmitter but the preceding vehicle is actually not the transmitter; or a false-negative identification where the preceding vehicle is incorrectly identified as not being the transmitter but the preceding vehicle is actually the transmitter.

16. The system of claim 13, wherein the computer code, when executed by the onboard vehicle computer system, causes the onboard vehicle computer system further to:

responsive to determining that the preceding vehicle is the transmitter, modify an operation of one or more of an inter-vehicle distance management module and an Advanced Driver Assistance System (ADAS system) of the ego vehicle to avoid a collision with the preceding vehicle.

17. The system of claim 13, wherein determining that the preceding vehicle is the transmitter is further based on determining that there is no following vehicle behind the transmitter.

18. The system of claim 13, wherein the computer code, when executed by the onboard vehicle computer system, causes the onboard vehicle computer system to determine that the preceding vehicle is the transmitter at least by:

responsive to determining that the position difference satisfies the position-deviation threshold, determining a first estimated distance between the ego vehicle and the preceding vehicle and a second estimated distance between the transmitter and a following vehicle that is behind the transmitter;

determining whether a distance difference between the first estimated distance and the second estimated distance satisfies a distance-deviation threshold; and responsive to determining that the distance difference satisfies the distance-deviation threshold, determining that the preceding vehicle is the transmitter.

19. A computer program product comprising a non-transitory memory of an onboard vehicle computer system of an ego vehicle storing computer-executable code that, when executed by a processor, causes the processor to:

receive, by a communication unit of the ego vehicle, a Vehicle-to-Everything (V2X) message that includes identification data of a transmitter of the V2X message wherein the identification data includes lane data describing a lane of travel for the transmitter;

measure a distance between the ego vehicle and a preceding vehicle ahead of the ego vehicle;

responsive to determining that the distance between the ego vehicle and the preceding vehicle is smaller than a minimum distance threshold, modify the distance between the ego vehicle and the preceding vehicle to satisfy the minimum distance threshold so that the distance is a modified distance that is configured to reduce an occurrence of a misidentification of the preceding vehicle as the transmitter of the V2X message; and determine that the preceding vehicle is the transmitter based on the lane data and a determination that a position difference between an estimated position of the preceding vehicle ahead of the ego vehicle and a measured position of the transmitter satisfies a position-deviation threshold, wherein the position-deviation threshold is based on a measurement error by a sensor and the measured position of the preceding vehicle is determined based on global positioning system data having any characteristics so that application of a global positioning system noise filter to the global positioning system data is not needed to determine that the preceding vehicle is the transmitter of the V2X message.

20. The computer program product of claim 19, wherein the position-deviation threshold is calculated from two global positioning system location data errors and one ranging-sensor measurement error.

* * * * *